US009842357B2

(12) United States Patent
Weerasinghe

(10) Patent No.: US 9,842,357 B2
(45) Date of Patent: *Dec. 12, 2017

(54) METHODS, SYSTEMS, AND PRODUCTS FOR PERSONALIZED HAPTIC EMULATIONS

(71) Applicant: AT&T Intellectual Property I, L.P., Atlanta, GA (US)

(72) Inventor: Srilal Weerasinghe, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/271,651

(22) Filed: Sep. 21, 2016

(65) Prior Publication Data
US 2017/0011443 A1     Jan. 12, 2017

Related U.S. Application Data

(63) Continuation of application No. 13/420,638, filed on Mar. 15, 2012, now Pat. No. 9,483,771.

(51) Int. Cl.
| | | |
|---|---|---|
| *G06Q 30/00* | (2012.01) | |
| *G06Q 30/06* | (2012.01) | |
| *G06Q 30/02* | (2012.01) | |
| *G06F 3/01* | (2006.01) | |
| *G06F 17/30* | (2006.01) | |

(52) U.S. Cl.
CPC ......... *G06Q 30/0625* (2013.01); *G06F 3/016* (2013.01); *G06F 17/30864* (2013.01); *G06Q 30/02* (2013.01); *G05B 2219/40122* (2013.01)

(58) Field of Classification Search
CPC ............ G06Q 30/0625; G06Q 30/02; G05B 2219/40122; G06F 3/016; G06F 17/30864
USPC ............................................... 705/26.1–27.2
See application file for complete search history.

(56) References Cited

U.S. PATENT DOCUMENTS

| | | | |
|---|---|---|---|
| 6,750,848 B1 | 6/2004 | Pryor | |
| 6,965,868 B1 * | 11/2005 | Bednarek | G06Q 30/0201 |
| | | | 705/26.1 |
| 7,336,266 B2 | 2/2008 | Hayward et al. | |
| 7,339,574 B2 | 3/2008 | Kyung et al. | |
| 8,655,053 B1 * | 2/2014 | Hansen | G06Q 10/10 |
| | | | 382/154 |

(Continued)

OTHER PUBLICATIONS

"Bodymetrics Creates 3D Body Scanner for New Look," Oct. 24, 2011, downloaded from the Internet at http://www.forbes.com/sites/jenniferhicks/2011/10/24/bodymetrics-creates-3d-body-scanner-for-new-look/, 3 pgs.

*Primary Examiner* — William Allen
*Assistant Examiner* — Anand Loharikar
(74) *Attorney, Agent, or Firm* — Chiesa Shahinian & Giantomasi PC

(57) ABSTRACT

Methods, systems, and products personalize haptic emulations of merchandise. A query regarding an article of merchandise having an associated digital image is made and the digital image is modified based on a personal anatomical image and anthropometrical data associated with a user by personalizing a portion of the digital image to the user, such that a haptic emulation of the article of merchandise is modified in accordance with the anthropometrical data and provided with the modified digital image.

20 Claims, 18 Drawing Sheets

(56) References Cited

U.S. PATENT DOCUMENTS

| | | | |
|---|---|---|---|
| 2001/0026272 A1* | 10/2001 | Feld | A41H 3/007 345/419 |
| 2008/0129705 A1 | 6/2008 | Kim et al. | |
| 2009/0146948 A1 | 6/2009 | Lee et al. | |
| 2009/0189874 A1 | 7/2009 | Chene et al. | |
| 2009/0222358 A1 | 9/2009 | Bednarek | |
| 2009/0231272 A1 | 9/2009 | Rogowitz et al. | |
| 2009/0326604 A1 | 12/2009 | Tyler et al. | |
| 2010/0077261 A1 | 3/2010 | Jung et al. | |
| 2010/0134612 A1 | 6/2010 | Pryor et al. | |
| 2010/0269054 A1 | 10/2010 | Goldberg et al. | |
| 2011/0010266 A1 | 1/2011 | Edwards | |
| 2011/0254671 A1 | 10/2011 | Okimoto et al. | |

\* cited by examiner

METHODS, SYSTEMS, AND PRODUCTS FOR PERSONALIZED HAPTIC EMULATIONS

This application is a continuation of prior U.S. patent application Ser. No. 13/420,638, filed Mar. 15, 2012, which is herein incorporated by reference in its entirety.

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

This disclosure generally relates to computer graphics processing and to data processing and, more particularly, to electronic shopping and to graphical representations of items or shoppers.

Haptic technology emulates the "touch and feel" of real material. Wood, metal, leather, and other materials may be simulated. Conventional haptic scans of merchandise, though, are abstract and impersonal.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
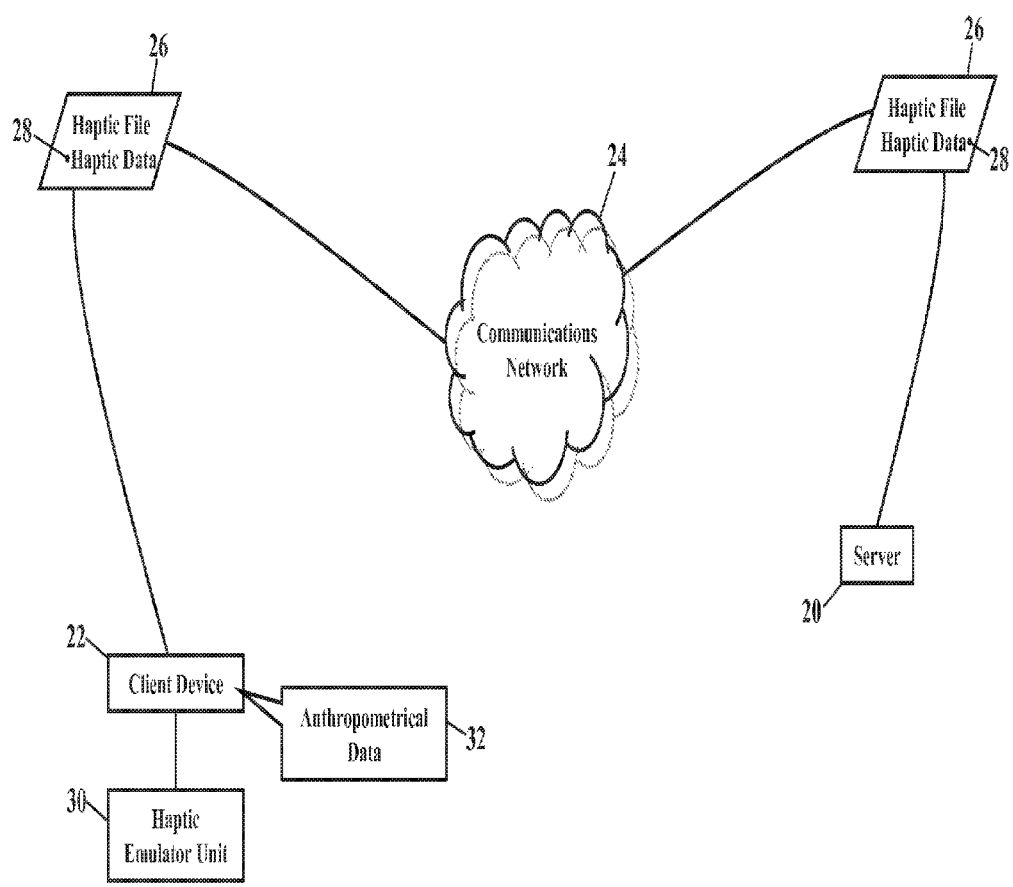
FIG. 1 is a simplified schematic illustrating an environment in which exemplary embodiments may be implemented.

FIG. 1 is a simplified schematic illustrating an environment in which exemplary embodiments may be implemented. FIG. 1 illustrates a client-server network architecture that personalizes haptic renderings of merchandise. A client device 22 communicates with a server 20 via a communications network 24. If a user of the client device 22 wishes to "touch and feel" merchandise (such as a bracelet, dress, watch, or other item), the client device 22 retrieves a haptic scan of the merchandise. That is, the client device 22 queries the server 20 for a haptic file 26 that describes haptic data 28 associated with the merchandise. The client device 22 receives the haptic file 26 and sends the haptic file 26 to a haptic emulator unit 30. The haptic emulator unit 30 processes the haptic data 28 to produce a haptic, tactile sensation for the user. The haptic emulator unit 30 thus reproduces the "touch and feel" of the merchandise, allowing the user to sense texture, contour, and other haptic effects. Haptic emulation is generally known to those of ordinary skill in the art, so this disclosure will not greatly describe the known aspects.

Exemplary embodiments, though, personalize the haptic emulation. Before the haptic emulator unit 30 renders the haptic data 28 in the haptic file 26, the client device 22 may retrieve the user's personalized anthropometrical data 32. The anthropometrical data 32 describes the physical, two-dimensional or three-dimensional measurements of the user's various body parts. The anthropometrical data 32, for example, may dimensionally describe the user's hand, arm, head, leg, and/or torso. The anthropometrical data 32 may even dimensionally describe the user's whole body, including weight, height, body mass, hair color, skin color, eye color, and any other features. Whatever the anthropometrical data 32, the client device 22 retrieves the user's personalized anthropometrical data 32. The client device 22 may then process the haptic data 28 in the haptic file 26 using the user's personalized anthropometrical data 32. For example, the client device 22 instructs the haptic emulator unit 30 to render the haptic data 28 according to the user's personalized anthropometrical data 32. That is, the haptic emulator unit 30 reproduces the "touch and feel" of the merchandise, but the haptic effect is personalized to the user's personal dimensions.

Exemplary embodiments thus personalize haptic emulations. The "touch and feel" of a bracelet, for example, is generated to custom-fit the user's wrist. Rings may be sized to the user's desired finger. Emulations of shirts, dresses, pants, and shoes may be tailored to the actual sizes of the user's corresponding body dimensions. Conventional haptic scans of merchandise are abstract and non-personal. Exemplary embodiments, though, combine the haptic data 28 with the user's personal measurements, thus customizing emulations for an accurate dimensional result.

Exemplary embodiments greatly enhance electronic commerce. When the user shops online for merchandise, exemplary embodiments allow users to experience the actual touch and feel of the merchandise in their correct sizes. Clothing may dimensioned for an accurate fit to the user's anthropometrical data 32. The user may compare different standard sizes of clothing to their actual body dimensions. Jewelry may be tactilely emulated using the actual dimensions of the user's neck, ears, and head. Personalized haptic emulations will thus be attractive to potential buyers. Merchants will see increased sales, increased customer satisfaction, and reduced returns due to ill-fitting merchandise.

Consider a common example of clothing. Haptic scans of objects (such as a shirt or blouse) downloaded from an Internet catalog are inherently abstract and not tailor-made per each user. If the user only desires the mere "touch and feel" of the clothing, the lone haptic data 28 may be adequate. However, if the user wishes to virtually "try on" the clothing, customization is needed for accurate haptic rendering. Exemplary embodiments produce virtual merchandise worn over the virtual body parts of the user. The user is thus able to appraise its visual, tactual, as well as its haptic/physical properties (i.e., how a bracelet feels as it is moved against the hand) for a more fulfilling experience.

Exemplary embodiments may be applied regardless of network environment. The communications network 24 may be a cable network operating in the radio-frequency domain and/or the Internet Protocol (IP) domain. The communications network 24, however, may also include a distributed computing network, such as the Internet (sometimes alternatively known as the "World Wide Web"), an intranet, a local-area network (LAN), and/or a wide-area network (WAN). The communications network 24 may include coaxial cables, copper wires, fiber optic lines, and/or hybrid-coaxial lines. The communications network 24 may even include wireless portions utilizing any portion of the electromagnetic spectrum and any signaling standard (such as the I.E.E.E. 802 family of standards, GSM/CDMA/TDMA or any cellular standard, and/or the ISM band). The communications network 24 may even include powerline portions, in which signals are communicated via electrical wiring. The concepts described herein may be applied to any wireless/wireline communications network, regardless of physical componentry, physical configuration, or communications standard(s).

Figure 2:
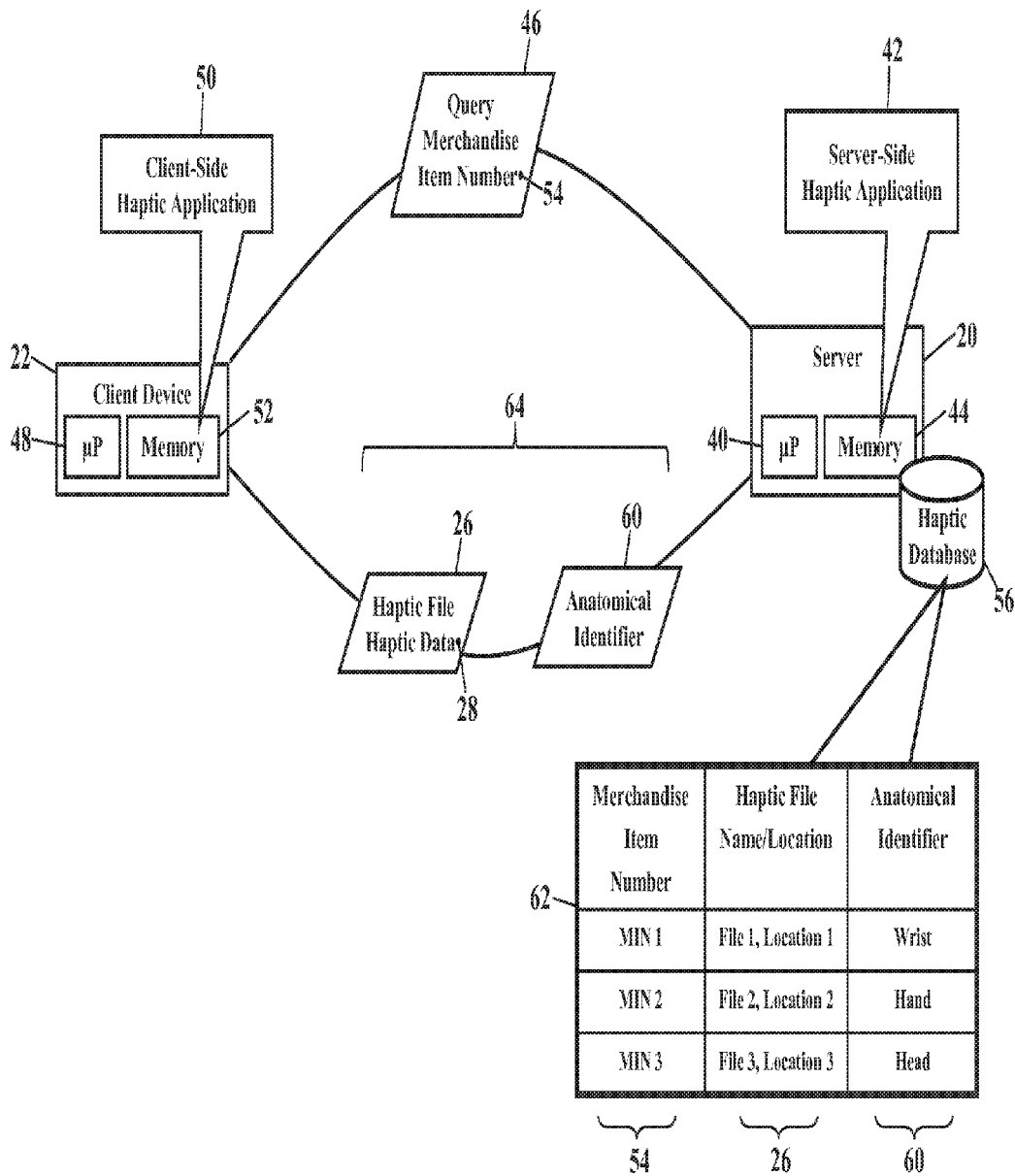
FIGS. 2 and 3 are more detailed schematics illustrating the operating environment, according to exemplary embodiments.
Figure 3:
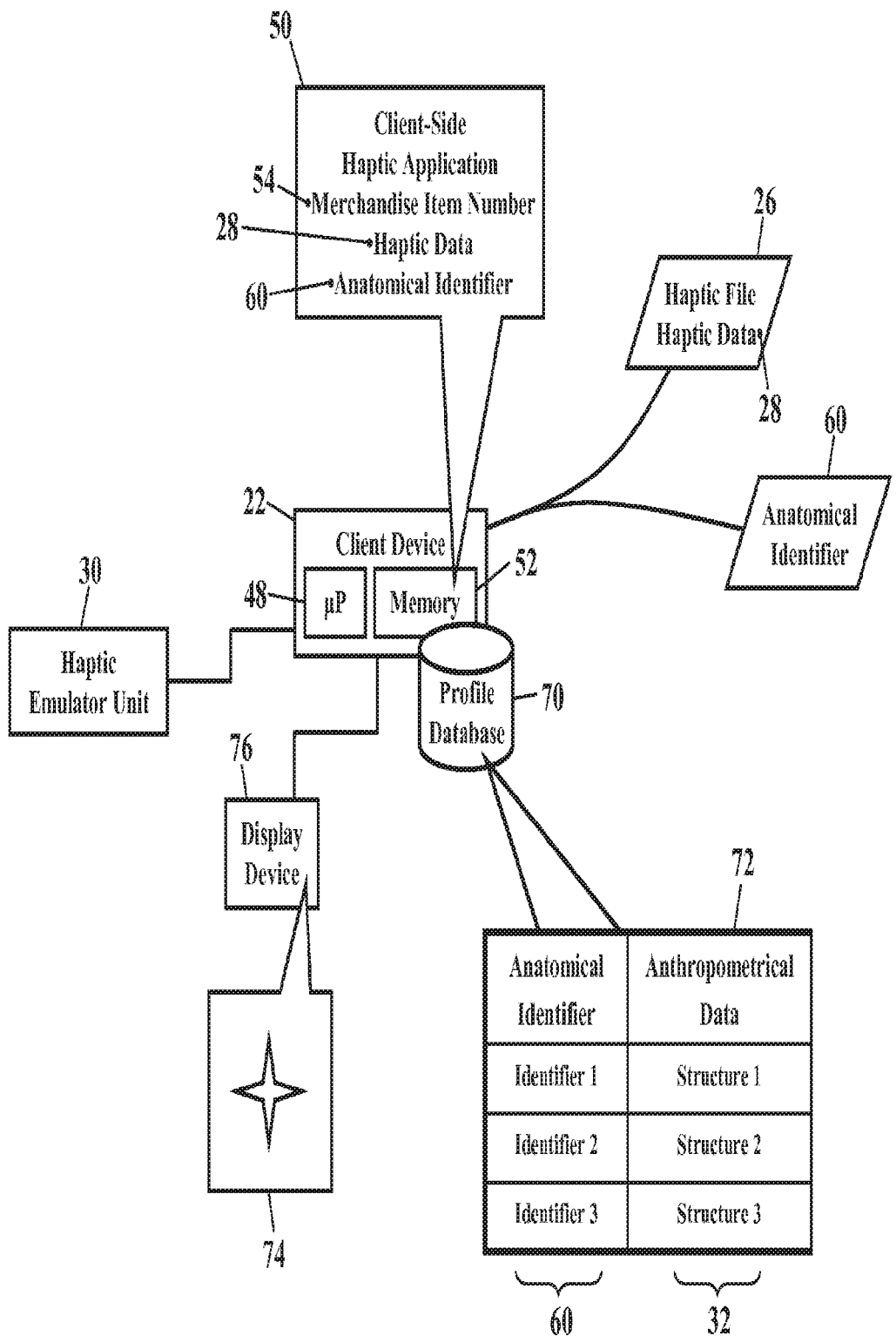

FIGS. 2-3 are more detailed schematics illustrating the operating environment, according to exemplary embodiments. Here the server 20 has a processor 40 (e.g., "µP"), application specific integrated circuit (ASIC), or other component that executes a server-side haptic application 42 stored in a memory 44. As later paragraphs will explain, though, the server-side haptic application 42 may operate in any processor-controlled device.

The server 20 receives a query 46 from the client device 22. The client device 22 has a processor 48 (e.g., "µP"), application specific integrated circuit (ASIC), or other component that executes a client-side haptic application 50 stored in a memory 52. The client-side haptic application 50 may cooperate with the server-side haptic application 42 to personalize haptic emulations of merchandise. When the client device 22 sends the query 46, the query 46 may include a merchandise item number 54. The merchandise item number 54 may be any data that uniquely identifies some merchandise. The user of the client device 22, for example, usually selects some product or service from a shopping channel, an electronic catalog, or a website. If the user wishes to receive more information about the merchandise, the user's client device 22 sends the merchandise item number 54 to the server 20. The server 20 queries a haptic database 56 for the haptic file 26 associated with the merchandise item number 54. The server 20 then return sends the haptic file 26 to a network address associated with the client device 22 (or to any other destination address requested by the user).

Exemplary embodiments, though, may include an anatomical identifier 60. Because the haptic file 26 may be personalized to the user's body dimensions, the server 20 may also return the anatomical identifier 60. The anatomical identifier 60 may be included within the haptic data 28 of the haptic file 26, and/or the anatomical identifier 60 may be separately sent. Regardless, the anatomical identifier 60 identifies some anatomical part that is associated with the merchandise item number 54. For example, if the merchandise item number 54 identifies a bracelet, then the anatomical identifier 60 may identify "wrist." Exemplary embodiments may then use the anatomical identifier 60 to custom-fit the haptic scan of the bracelet to the physical dimensions of the user's wrist. If the merchandise item number 54 identifies a jacket, then the anatomical identifier 60 may identify "chest," "arm," and/or "torso." If the merchandise item number 54 identifies a "glove," then the anatomical identifier 60 may identify "hand." If the merchandise item number 54 identifies "pants," then the anatomical identifier 60 may identify "leg." Just as merchandise may be generally associated with different genres or categories of products and services, exemplary embodiments may associate the merchandise to different parts of the body. Exemplary embodiments may thus use the anatomical identifier 60 to personalize haptic emulations of merchandise.

As FIG. 2 illustrates, the haptic database 56 may associate different merchandise item numbers 54 to different anatomical identifiers 60. The haptic database 56 is illustrated as a table 62 that maps, relates, or otherwise associates the merchandise item number (or "MIN") 54 to the corresponding haptic file 26. Here, though, the haptic database 56 also associates the merchandise item number 54 to the corresponding anatomical identifier 60. FIG. 2 illustrates simple term associations, such as "wrist," "hand," and "head." In actual practice, though, the anatomical identifiers 60 will likely be more complex alphanumeric combinations for detailed human or animal body parts. An index finger, for example, may be differentiated from a ring finger, a thumb, and a smallest fifth ("pinkie") finger. The right hand may differentiated from the left hand, along with the corresponding digits. Differentiations may be applied to the feet, arms, legs, ears, and eyes. Other unique anatomical identifiers 60 may be associated to the torso, head, waist, chest, back, and other body parts or regions. Internal organs may also be identified, and the unique anatomical identifiers 60 may be applied to human and non-human species. One or more anatomical identifiers 60 may be assigned to multiple body parts, such as a combination finger-hand-wrist-forearm-elbow.

The server 20 responds to the query 46. Whatever the anatomical identifier(s) 60, the server-side haptic application 42 retrieves the one or more anatomical identifiers 60 that are associated with the merchandise item number 54. The server 20 sends a query response 64, such as the haptic file 26 and/or the one or more anatomical identifiers 60. The query response 64 routes through the communications network (illustrated as reference numeral 24 in FIG. 1) to the address associated with the client device 22.

FIG. 3 illustrates personalization of haptic emulations. When the client device 22 receives the anatomical identifier 60, the client-side haptic application 50 may query a profile database 70. The profile database 70 is illustrated as being locally stored in the memory 52 of the client device 22, but the profile database 70 may be remotely stored and accessed from any location in the communications network 24. The profile database 70 stores the user's personalized anthropometrical data 32. FIG. 3 illustrates the profile database 70 as a table 72 that maps, relates, or otherwise associates different anatomical identifiers 60 to the corresponding anthropometrical data 32 of the user's body parts. If the anatomical identifier 60 is associated to a "wrist," for example, then the client-side haptic application 50 retrieves the anthropometrical data 32 describing the user's wrist. If the anatomical identifier 60 identifies "arm," then the anthropometrical data 32 for the user's arm is retrieved. The client device 22 then instructs the haptic emulator unit 30 to render the haptic data 28 to the user's anthropometrical data 32. The haptic emulator unit 30 thus produces a haptic emulation of the merchandise associated with the merchandise item number 54, but the haptic emulation is sized to the user's anthropometrical data 32. Exemplary embodiments may thus use the anatomical identifier 60 to personalize haptic emulations of merchandise to the user's personal dimensions. The client-side haptic application 50 may even cause or instruct the processor 48 to produce a graphical user interface 74 on a display device 76, thus allowing the user to further configure and personalize the haptic emulation (as later paragraphs will explain).

The profile database 70 may store profiles for multiple users. The profile database 70 may store a profile for each of multiple users, and each user's respective profile stores the user's personalized anthropometrical data 32. Each user may thus establish their own personalizations for haptic emulations. Because the anthropometrical data 32 may describe body dimensions, health factors, and other sensitive information, any authentication and/or security procedures may be required to successfully access the user's personalized anthropometrical data 32.

Figure 4:
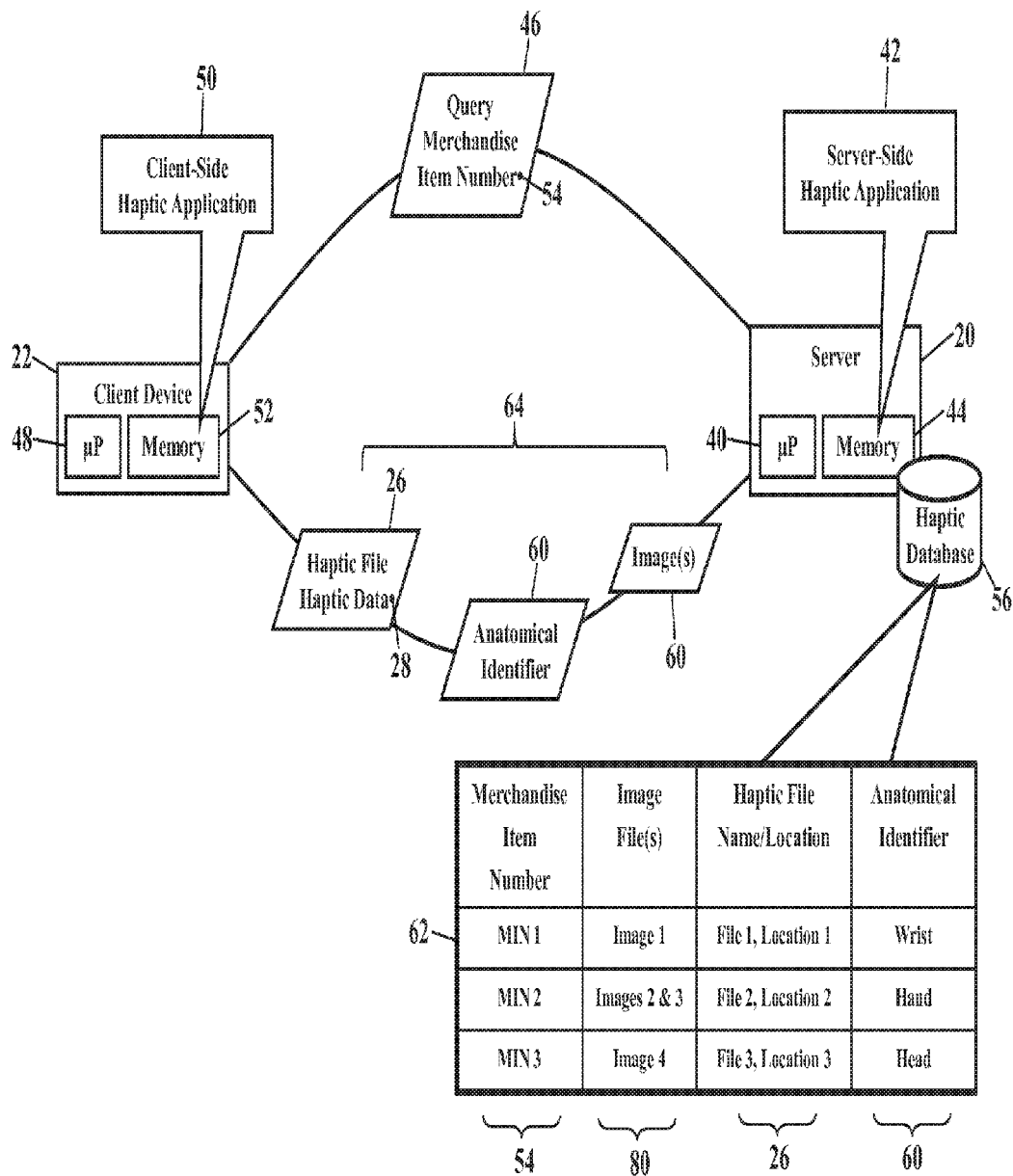
FIGS. 4-5 are schematics illustrating image modification, according to exemplary embodiments.
Figure 5:
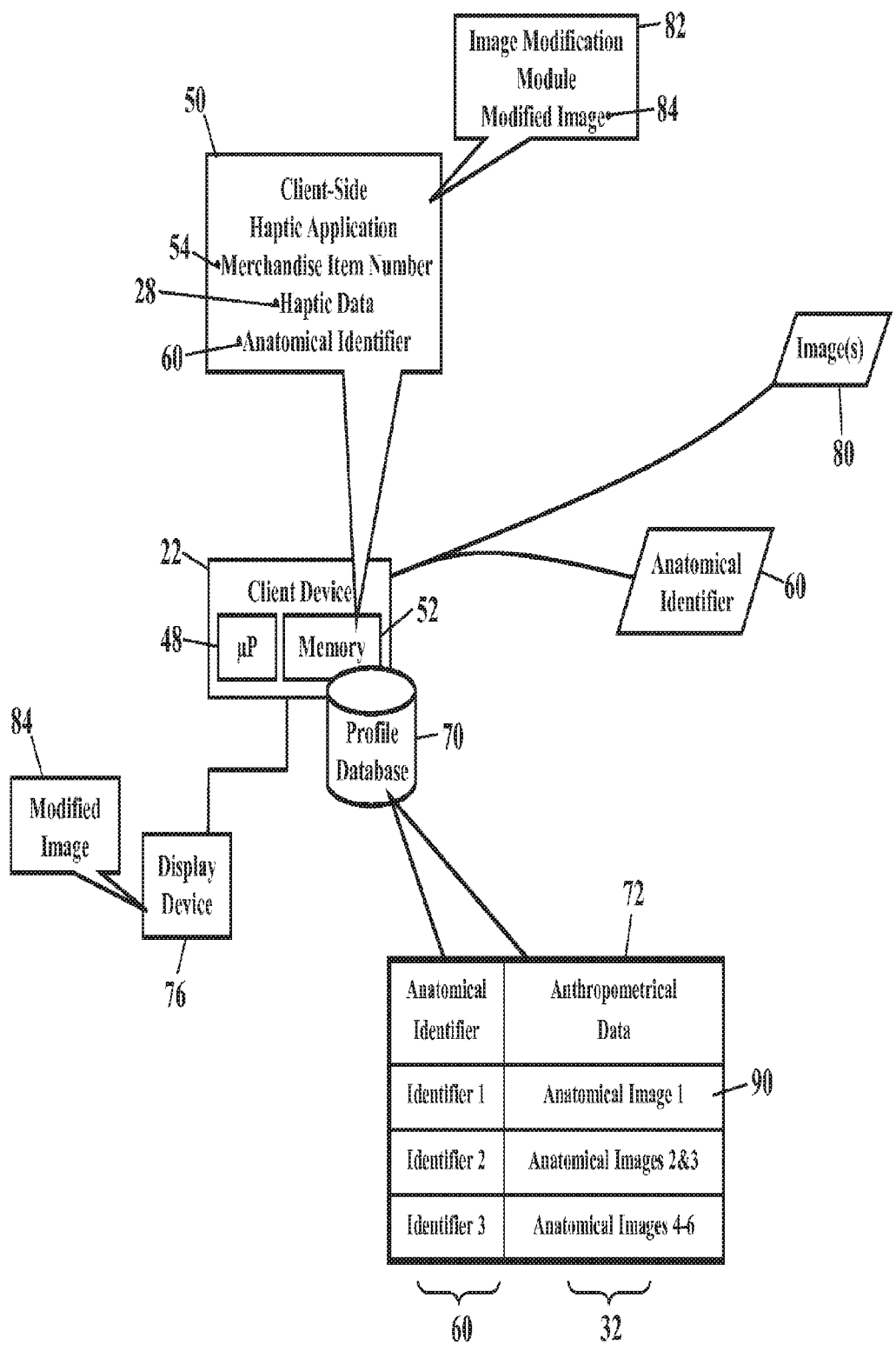

FIGS. 4-5 are schematics illustrating image modification, according to exemplary embodiments. Here exemplary embodiments may personalize images 80 of merchandise. When the server 20 receives the merchandise item number 54 from the client device 22, the server 20 may also return one or more digital images 80 of the corresponding merchandise. The client device 22 may then modify the images 80 to include the user's personal body parts.

As FIG. 4 illustrates, the haptic database 56 may associate the different merchandise item numbers 54 to the images 80 of the corresponding merchandise. The haptic database 56 may store pointers to one or more digital images or even video of the merchandise associated with the merchandise item number 54. The server-side haptic application 42 retrieves the images 80 associated with the merchandise item number 54. The server 20 may send the images 80 in response to the query 46, perhaps along with the haptic file 26 and/or the anatomical identifier(s) 60. When the client device 22 receives the images 80, the client-side haptic application 50 may then personalize the images 80.

As FIG. 5 illustrates, the client device 22 may then consult the profile database 70. The client-side haptic application 50 queries the profile database 70 for the user's personalized anthropometrical data 32 that is associated with the anatomical identifier 60. The client-side haptic application 50 may then call or invoke an image modification module 82. The image modification module 82 is a subset or routine of instructions or code that cause the client-side haptic application 50 to modify the one or more images 80. The client-side haptic application 50 retrieves the personalized anthropometrical data 32 that is associated with the anatomical identifier 60. The image modification module 82 then generates one or more modified images 84 using the anthropometrical data 32. The modified images 84 may then be output to the display device 76 for display to the user.

The personalized anthropometrical data 32, for example, may include personal anatomical images 90. Each personal anatomical image 90 may be some digital image or dimensional data describing a body part of the user. The client-side haptic application 50 may then call or invoke the image modification module 82 to modify the image(s) 80 received from the server 20. The image modification module 82 generates the modified image 84 using the personal anatomical image 90 of the user. The image modification module 82, for example, replaces generic legs, arms, and/or hands with images and/or data representing the user's own legs, arms, and/or hands. The merchandise shown in the image 80 is thus modified to appear as being worn by the user. Any body part or feature in any image 80 may be personalized by substitution, replacement, overlay, deletion, addition, merger, or any other imaging technique.

Image modification drives purchases. As shoppers view merchandise for sale, exemplary embodiments may replace generic or impersonal features with personalized features. A model's hand, for example, may be replaced with the user's personal image of their hand. An image of a watch on a model's wrist may be modified to display the watch on the user's wrist. A hat or wig may be display on the user's head. Graceful, perfect hosts wearing the merchandise may be replaced with the user's personalized anthropometrical data 32, thus yielding a far more persuasive selling environment. If the user's personalized anthropometrical data 32 includes a full-body, three-dimensional scan, then the user may see images and even video rendered using their own virtual avatar.

Figure 6:
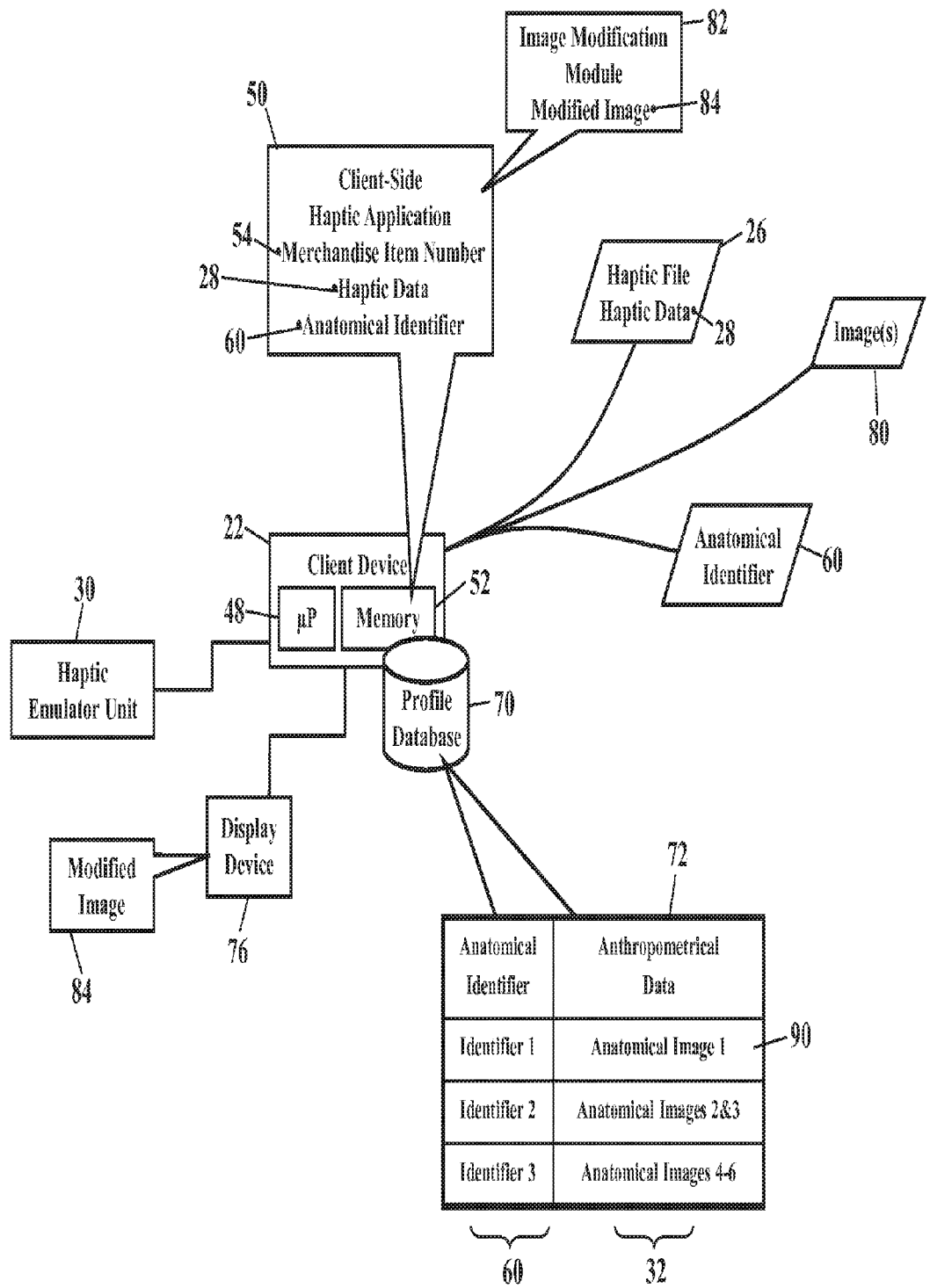
FIG. 6 is a schematic integrating both haptic emulation and image modification, according to exemplary embodiments.

FIG. 6 is a schematic integrating both haptic emulation and image modification, according to exemplary embodiments. Here exemplary embodiments may use the personalized anthropometrical data 32 to persuasively combine haptic emulation and image modification. The haptic emulator unit 30 uses the haptic data 28 and the user's personalized anthropometrical data 32 to emulate the customized "touch-feel effect" of merchandise, per the user's physical dimensions. Simultaneously the client device 22 visually emulates how the merchandise would look on the user's body. If the user wishes to experience a jacket, for example, the haptic emulator unit 30 custom fits the jacket to the user's physical dimensions, while the display device 76 emulates how the jacket would look on the user's virtual body. Generic or model images of body parts may thus be visually replaced with the user's anthropometrical data 32.

Exemplary embodiments may be applied to any emulator technology. The haptic emulator unit 30 generically provides some kind of force feedback to provide tactile and/or kinesthetic sensation(s). This feedback is used to provide perception of textures, ridges, vibrations, pulses, and even sounds and color. The haptic emulator unit 30 may use any technology, such as electro-mechanical actuation, ultrasound localized vibrators, micro-electric fields, viscous magnetic fluids, holographic projection, and/or organic light emitting diodes. The specific technology, though, is unimportant, as exemplary embodiments may be used to personalize any haptic emulation. Exemplary embodiments thus include the haptic emulator unit 30 having an ability to render customized haptic/tactile responses based on the anthropometrical data 32. Current haptic emulators may be adapted to adjust haptic responses per user data residing outside of the haptic emulator unit 30. For example, exemplary embodiments may modify the downloaded haptic file 26 per user data and supply it to a conventional haptic emulator unit.

Exemplary embodiments may include multiple types of haptic devices. For example, a glove-like device for appraising ornaments worn over hands (rings, bracelets, watches, bangles as well as gloves) and a neck-strap type device for necklaces. An abstract haptic scan of the merchandise may be combined with the personalized anthropometrical data 32, visually and haptically/tactually, to simulate the user's experience. As each haptic emulator unit 30 may be expensive, multiple haptic emulators may not be practical. Exemplary embodiments thus envision that malls/arcades would have kiosks equipped with haptic emulators and haptic scanners.

A customer, for example, may visit a haptic kiosk in a local shopping mall. The customer selects a necklace in a catalog, and haptic scans and associated images of the necklace are downloaded to develop a composite haptic-visual representation. The customer supplies his or her personalized anthropometrical data 32 for personalizing the haptic emulation. The personalized anthropometrical data 32, for example, may be stored in a memory card, USB device, or wireless memory device that the customer carries. Alternately, the customer's personalized anthropometrical data 32 may be downloaded from a website or remote computer. Regardless, the haptic emulating device at the kiosk will take as input the customer's personalized anthropometrical data 32 (or applicable portion of it) for the emulation. The customer perhaps dons a wearable haptic emulator unit, such as neck-strap-like device inside the kiosk to emulate haptic sensing of wearing the necklace. Similarly, the touch-feel of wearing a virtual pair of jeans may be emulated by a wearable haptic emulator unit in the shape of a pair of pants. The sensors embedded in the pants auto adjust per user measurements to supply haptic sensation.

Exemplary embodiments may also be applied to holographic simulation. Perhaps holographic simulation is an alternate solution to a multitude of haptic devices. Mall kiosks equipped with holographic simulation equipment may provide haptic rendering without any contraptions for body parts. A customer, for example, invokes haptic rendering in the mall kiosk and a hologram of the necklace appears around the customer's neck, which can be observed via a display device or a mirror. Exemplary embodiments may thus be applied to any holographic technology.

Haptic devices may be configured to suit any objective. For example, many bricks-and-mortar retailers (such as MACY'S®) have a large area filled with several or even dozens of mattresses. Customers may lie on different mattresses and evaluate their comfort. Exemplary embodiments, though, allow the many different mattresses to be replaced by one or a few space-saving haptic emulator units 30. Each haptic emulator unit 30 is preferably the same length and width as an actual bed, thus emulating the feel of each mattress as the customer evaluates. The customer's personalized anthropometrical data 32 is obtained, including the customer's weight distribution and body contours. The customer's personalized anthropometrical data 32, for example, may be stored in a credit card-sized memory device for easy retrieval. The card's magnetic strip is swiped to obtain the customer's personalized anthropometrical data 32. Regardless, the haptic emulator unit 30 may then realistically simulate the look and feel of each different mattress, thus relieving the retailer of large floor space.

Exemplary embodiments, likewise, may personalize any merchandise. Just as the haptic emulator unit 30 may personalize mattresses, the haptic emulator unit 30 may similarly personalize chairs and sofas. Automotive seats may be personalized to riders, and baby seats may be personalized to infants and toddlers. Ballistic vests may be personalized to each law enforcement officer and to each soldier. Indeed, exemplary embodiments may personalize any merchandise.

Figure 7:
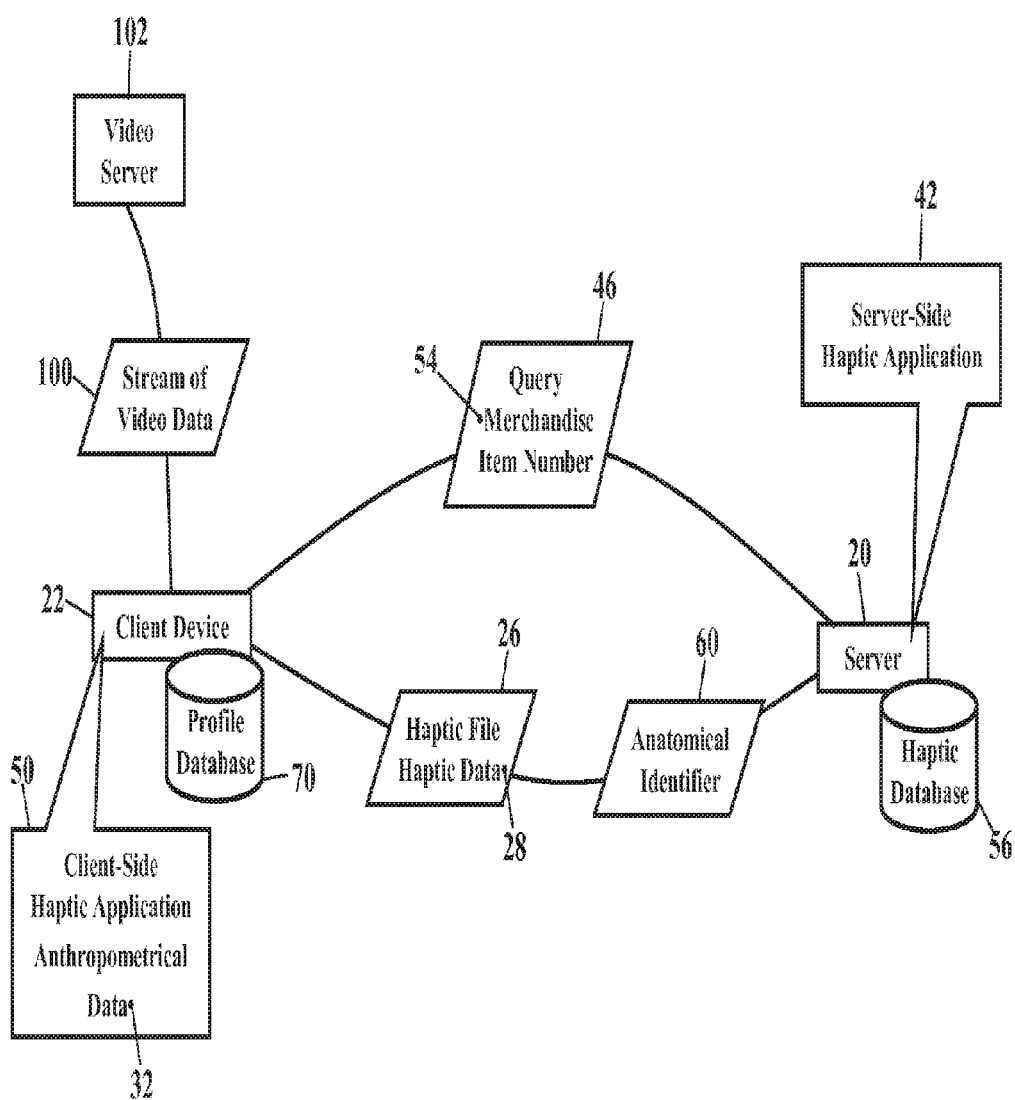
FIGS. 7-8 are schematics illustrating video implementation, according to exemplary embodiments.
Figure 8:
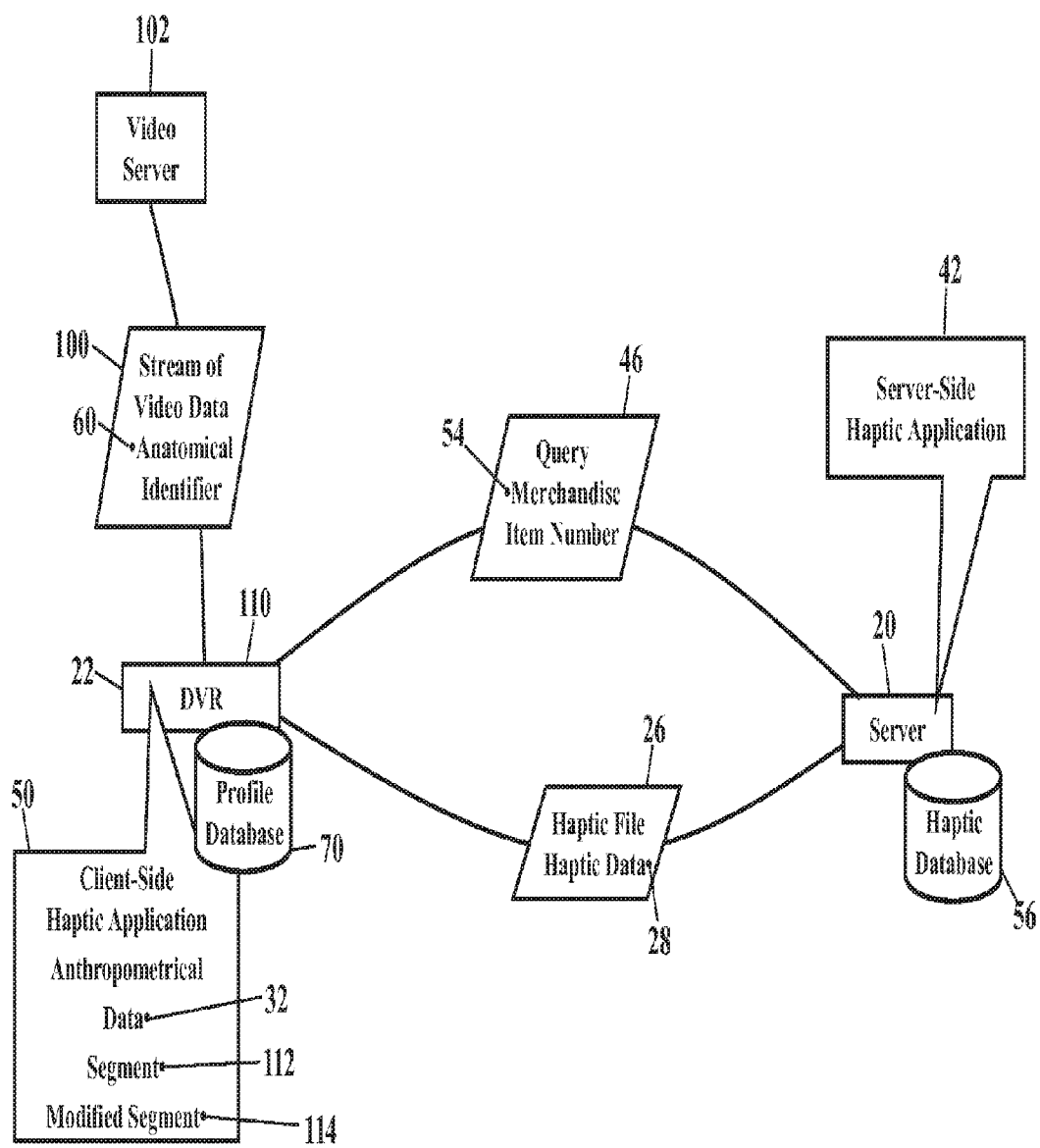

FIGS. 7-8 are schematics illustrating video implementation, according to exemplary embodiments. FIG. 7 illustrates that exemplary embodiments may be applied to broadcast, cable, Internet Protocol, and any other video or television offering. Here the client device 22 receives a stream 100 of video data. The client device 22 may tune to a channel (e.g., a shopping channel) sent from a headend, request data from a content server, download a file, or any other request mechanism. For simplicity, FIG. 7 illustrates the stream 100 of video data originating from a video server 102. Regardless, when the user sees some merchandise for which haptic emulation is desired, the user selects the merchandise described or shown in the stream 100 of video data. The client device 22 then sends the query 46 to the server 20 with the merchandise item number 54. The server-side haptic application 42 receives the merchandise item number 54, queries the haptic database 56, and retrieves the corresponding haptic file 26. The server 20 sends the haptic file 26 and/or the anatomical identifier 60 to the client device 22. The client device 22 retrieves the user's personalized anthropometrical data 32, as earlier paragraphs explained. The haptic emulator unit 30 then renders the haptic file 26 using the user's personalized anthropometrical data 32, also as earlier paragraphs explained. Moreover, exemplary embodiments may also personalize the stream 100 of video data with the user's personalized anthropometrical data 32. Any video data in the stream 100 of video data may be modified to include the personalized anthropometrical data 32. Suppose, for example, the user's personalized anthropometrical data 32 describes a virtual, but personal, avatar. Exemplary embodiments may thus personalize the video data in the stream 100 of video data. Again, graceful models and gushing hosts may be replaced with full-motion video generated using the user's personalized anthropometrical data 32. This "lean-back" television approach to shopping is more effective for persuasive selling, thus driving sales and also improving customer satisfaction.

FIG. 8 illustrates time-delayed personalization. Here the client device 22 is illustrated as a digital video recorder ("DVR") 110 that receives the stream 100 of video data. Here, though, the stream 100 of video data may also include the anatomical identifier 60. When image modification is desired, the client-side haptic application 50 (such as the image modification module 82 illustrated in FIGS. 5-6) causes the digital video recorder 110 to record a segment 112 of video data. The segment 112 of video data, for example, may be any portion of the stream 100 of video data for which image modification is desired. The personalized anthropometrical data 32 is retrieved that is associated with the anatomical identifier 60. The client-side haptic application 50 then generates a modified segment 114 of video data using the anthropometrical data 32. The modified segment 114 of video data may then output to the display device 76. The image modification module 82 thus personalizes the segment 112 of video data by modifying video aspects or features with the user's personal images and/or dimensions. Because the personalization may require additional processing time, the modified segment 114 of video data may be delayed, perhaps by a second or more. The client-side haptic application 50 may cause the digital video recorder 110 to cache unmodified portions of the originally-received stream 100 of video data. The client-side haptic application 50 may also synchronize the modified segment 114 of video data with the unmodified portions of the originally-received stream 100 of video data, such that seamless time-delayed personalization is performed.

As FIGS. 7-8 illustrate, exemplary embodiments include electronic shopping. Shopping channels (such as HSN® and QVC®) often present merchandise in a persuasive manner using graceful models and gushing hosts. Most consumers watch while relaxing in a comfortable couch or chair. This relaxed, "lean-back" shopping environment contrasts with Internet-based "lean-forward" web surfing through a catalogue or webpage for a single item. As such, "lean-back" television is more effective for persuasive selling than browsing through a web catalog. Exemplary embodiments thus enrich interactive audio-visual shopping experiences with personalized haptic rendering. The "lean-forward" verses "lean-back" difference (in Internet shopping verses TV shopping) maps into a more complicated back-end architecture for digital television. On the free Internet, quality of service and privacy are not guaranteed. Digital television, though, is enabled via private networks with tightly controlled quality of service and strict privacy. Exemplary embodiments thus personalize merchandise shown in advertisements, shopping channels, and programs.

Exemplary embodiments thus describe the Internet-based haptic database 56. The haptic database 56 may be interconnected to IPTV-based shopping channels. The merchandise may be pre-scanned to obtain the haptic data 28 in each haptic file 26. The haptic file 26 may thus be retrieved and routed to the client device 22, such as a subscriber's set-top box, converter, television, computer, or mobile device (as later paragraphs will explain). Indeed, as tablet devices continue to evolve and to drop in price, exemplary embodiments encompass a tablet device with haptic emulation.

Exemplary embodiments personalize haptic emulations. A haptic/tactile scan, by itself, is abstract and non-personal. However, exemplary embodiments combine the haptic data 28 with the personalized anthropometrical data 32. The personalized anthropometrical data 32 describes a user's, customer's, and/or subscriber's two- or three-dimensional measurements (perhaps obtained via 2D/3D scanning). Haptic emulations may thus be tailored to fit each person's unique physical features. For example, television and Internet via IPTV technology may be integrated. By leveraging Internet connectivity to pre-defined haptic-scan databases, IPTV consumers will be able to add haptic/tactile perception to audio-visual reception. Customers wanting to get a "touch-feel" before purchasing merchandise may do so from the home. The haptic emulator unit 30 thus emulates the customized "touch and feel" of merchandise while simultaneously the audio-visual medium (TV) emulates how the merchandise would look on the user's body. In the case of digital TV, the hand of the model showcasing the merchandise may be visually replaced by the user's avatar's hand, which is constructed based on the user's personalized anthropometrical data 32.

In another example, a simple search for "brown corduroy" may yield the haptic emulation of the fabric suitable just for touch-feel. But exemplary embodiments personalize the haptic emulation, such that the same search combined with the user's personalized anthropometrical data 32 renders the emulation of a pair of customized brown corduroy pants made to fit, thus enriching the user's experience.

The haptic emulator unit 30, however, may be too expensive for wide-spread adoption in homes. As earlier paragraphs mentioned, sophisticated emulator units may be installed in shopping malls, thus allowing mall shoppers to experience the benefits of haptic technology. Exemplary embodiments, though, include subscriber rental of the haptic emulator unit 30. Because the haptic emulator unit 30 may be sophisticated, complicated, and perhaps expensive equipment, many users may prefer to rent the haptic emulator unit 30. That is, the haptic emulator unit 30 may be rented from an Internet Service Provider or other entity, such as a cable, satellite, or DSL provider. The haptic emulator unit 30 may even be offered by individual merchants (such as AMAZON®) and by shopping channels.

Figure 9:
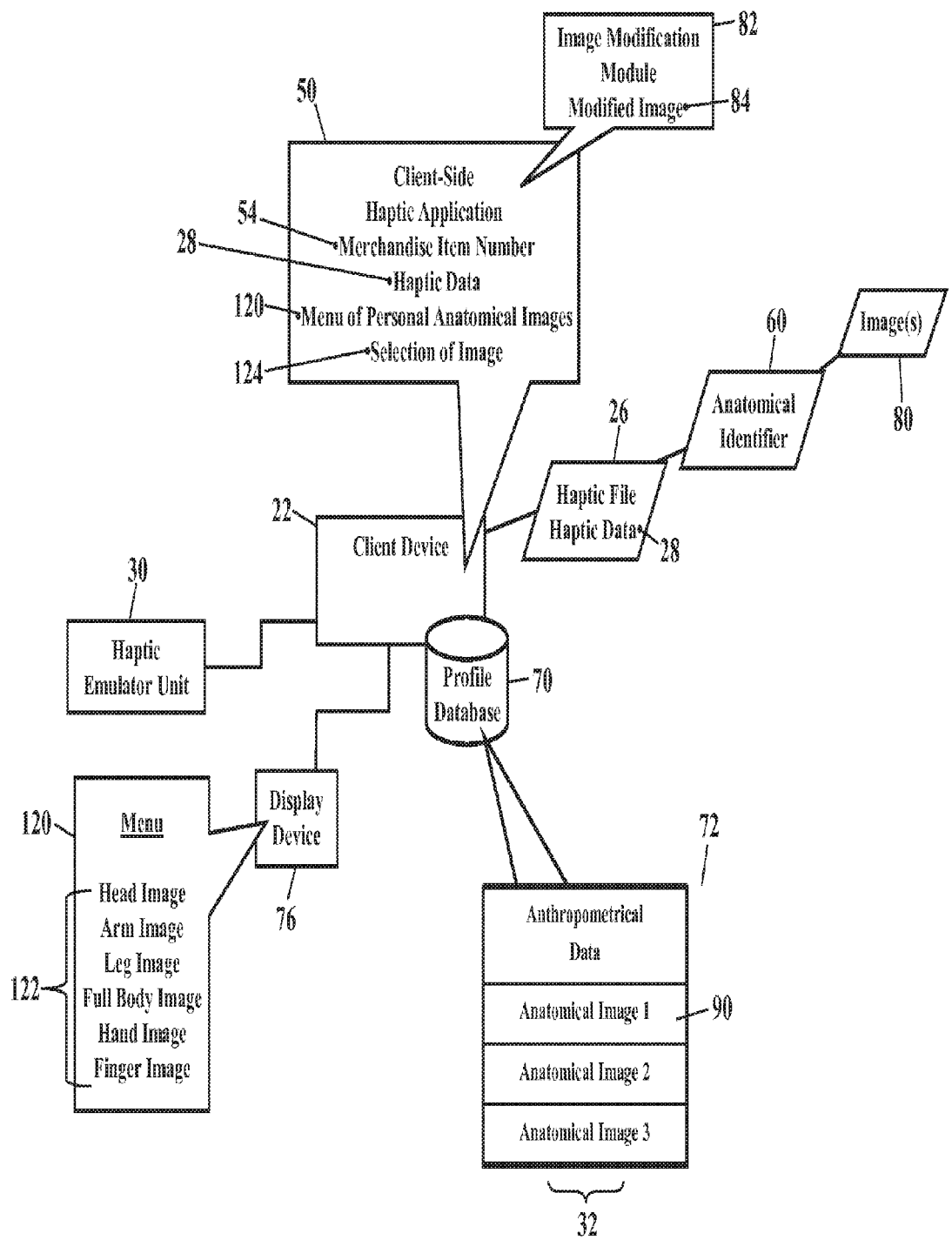
FIG. 9 is a schematic further illustrating image modification, according to exemplary embodiments.

FIG. 9 is a schematic further illustrating image modification, according to exemplary embodiments. Here the user may select body parts when illustrating merchandise. As FIG. 9 illustrates, the client device 22 again sends the merchandise item number 54 to the server 20, and the server 20 returns the haptic file 26, the digital image(s) 80 of the corresponding merchandise, and/or the corresponding anatomical identifier 60. Before or while rendering the haptic file 26, the user may select how the image 80 of the merchandise is illustrated and/or emulated. The client-side haptic application 50 may cause the client device 22 to retrieve a menu 120 of the personal anatomical images 90. As earlier paragraphs explained, each personal anatomical image 90 contains image data and/or dimensional data of the user's own body parts, such as arms, legs, hands, and torso. The client-side haptic application 50 may query the profile database 70 and retrieve a name of some or all personal anatomical images 90 in the user's profile. The menu 120 of personal anatomical images is visually displayed on the display device 76 and presents a listing 122 of the personal anatomical images 90. The user graphically makes a selection 124 of a desired body part, such as by moving a cursor and selecting a graphical control or link. The client-side haptic application 50 may then call or invoke the image modification module 82 to generate the modified image 84 of the merchandise using the user's selected body part. An image of a watch, for example, may be generated on the user's wrist. A shirt may be sized and displayed on the user's own torso. The user may select and swap different body parts, such that the watch is alternately displayed on the user's wrist, the user's arm, and in the user's hand. Exemplary embodiments may personalize by substitution, replacement, overlay, deletion, addition, merger, or any other imaging technique.

Figure 10:
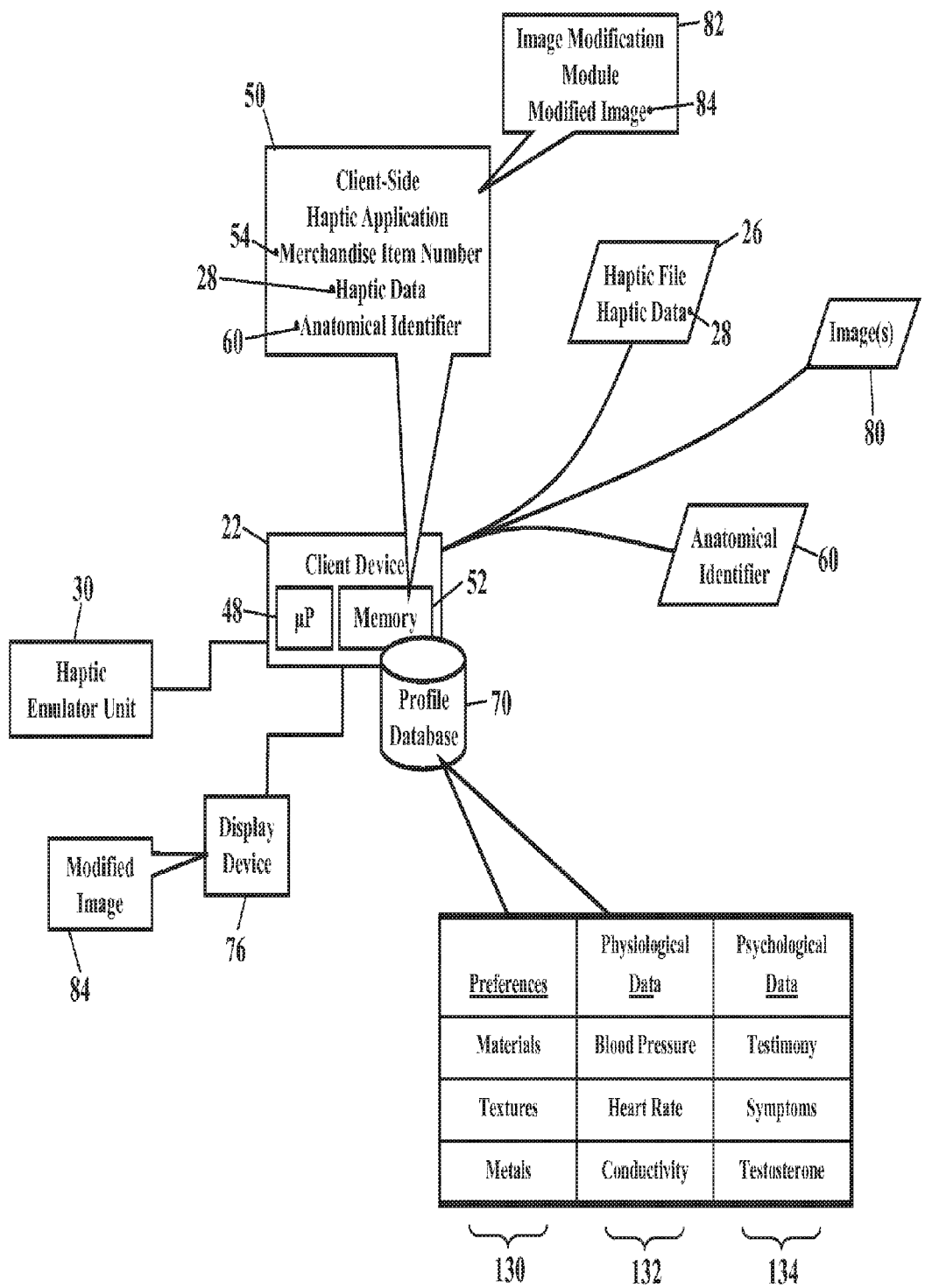
FIG. 10 is a schematic illustrating personalized anthropometrical data, according to exemplary embodiments.

FIG. 10 is a schematic further illustrating the personalized anthropometrical data 32, according to exemplary embodiments. Here the profile database 70 may store the user's preferences 130 when emulating the haptic file 26 and/or when modifying the image 80 received from the server 20. The user's preferences 130, for example, may describe preferred cloth types, preferred textures, and/or preferred roughness/smoothness of fabrics and other materials. If the haptic file 26 does not specify mandatory haptic requirements, the client-side haptic application 50 may present the user with options to select various haptic finishes for merchandise.

As FIG. 10 also illustrates, the profile database 70 may store the user's physiological data 132 and/or psychological data 134. The profile database 70, for example, may store the user's historical and/or current blood pressure, heart rate, and other vital signs. The user's personality traits may also be quantified and stored, perhaps describing the user's temperament, demeanor, and aggressiveness. These traits may be useful for accurate haptic rendering, especially during online interactive gaming.

Figure 11:
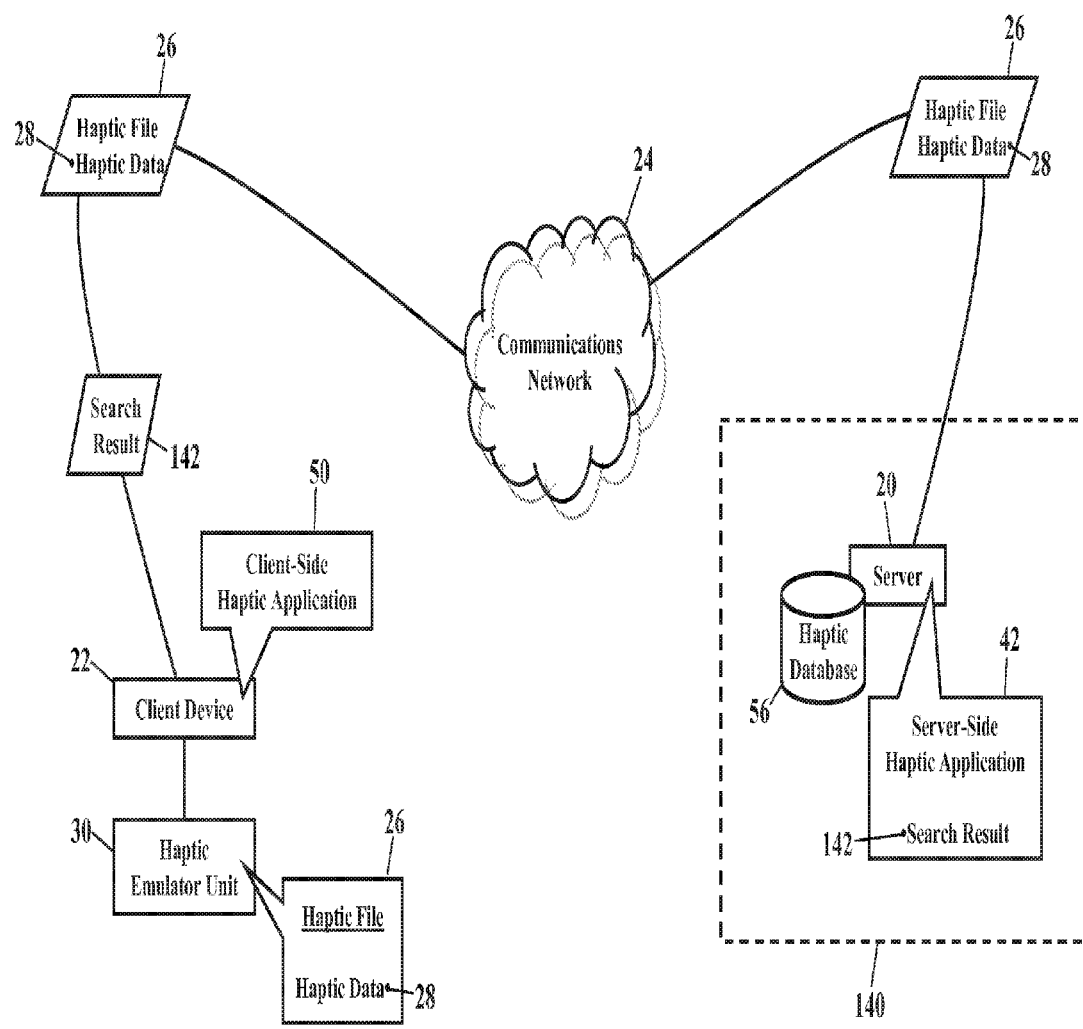
FIGS. 11-12 are schematics illustrating a haptic search engine, according to exemplary embodiments.

FIG. 11 is a schematic illustrating a haptic search engine 140, according to exemplary embodiments. Here the server-side haptic application 42 may act as a search engine to retrieve haptic search results. Unlike conventional text-based and image-based search engines, the haptic search engine 140 uses the haptic file 26 of an object as a primary input. The object is haptically scanned to obtain the haptic data 28 contained within the haptic file 26. As FIG. 11 illustrates, the haptic emulator unit 30 may have scanning capabilities to haptically scan objects of interest. Suppose, for example, a user wishes to search online for a fabric matching the "look and feel" of the upholstery of her couch. The user scans the upholstery (image+texture+touch-feel properties) using the scanning capabilities of the haptic emulator unit 30. The haptic emulator unit 30 thus creates the haptic-scanned data file 26. The haptic file 26 is then sent to the server 20. Because the server-side haptic application 42 may act as a query handler, the server-side haptic application 42 accepts the haptic file 26 as an input. However, auxiliary inputs may also include video clips, photos, and text strings as metadata describing the object. The server-side haptic application 42 queries the haptic database 56 for other haptic files matching the query. The server-side haptic application 42 retrieves a search result 142 and sends the search result 142 to some destination (such as the client device 22). The search result 142 may even be sent or routed to the haptic emulator unit 30 for personalized haptic emulation (as earlier paragraphs explained). The shopper appraises the haptic emulation and decides to place the order, whereby the client-side haptic application 50 connects to an ordering and billing system to complete the order. As conventional ordering and billing methods are known, ordering and billing are not shown for simplicity.

The haptic search engine 140 may have a front end user interface. The haptic search engine 140 may accept composite inputs such that the search criteria may consist of haptic scan data along with regular text (ASCII) and photo/video (JPEG/MPEG) of any object. The haptic database 56 stores entries, and any entry may have multiple associated components. An entry in the haptic database 56, for example, may include haptic scan data (tactile texture scan for 2D+physical properties such as rigidity, elasticity), image or multiple images in the case of a 3D body, a holographic scan of an item, and/or a 2D/3D/laser/optical scan of the item (physical size determination). This one-to-many relations in the haptic database 56 may include modifications to the data retrieval process of the haptic search engine 140 as well. With a conventional text-based search, a URL may be returned in response to a search query. In the haptic search engine 140, though, a single query may return the multiple components described above. The client-side haptic application 50 is configured to accept this composite output, process it, and render the haptic emulation, integrated with audio-visual simulation, personalized/customized per individual user.

Exemplary embodiments may also extract specific haptic features. As those of ordinary skill may realize, haptic-scanned data files may be inherently large as they may contain 3D data. Conventional video-based search processes are burdened by the complexity of comparing video clips frame by frame multiple times, within a large data repository. This complexity hampers the usability of search engines designed for audio/video clip search. Exemplary embodiments may circumvent this complexity, while facilitating haptic searches, by extracting salient features of a haptic scan and casting the extracted data into a parameterized form (e.g., number of ridges per inch). Exemplary embodiments may, for simplicity, assume that a uniform surface (such as a fabric) has a repeating pattern and can be characterized by a minimal set of unique properties. In such a case the metadata (the data that describes actual data), would be sufficient to describe the object rather than a bulky file with full haptic scan data.

Figure 12:
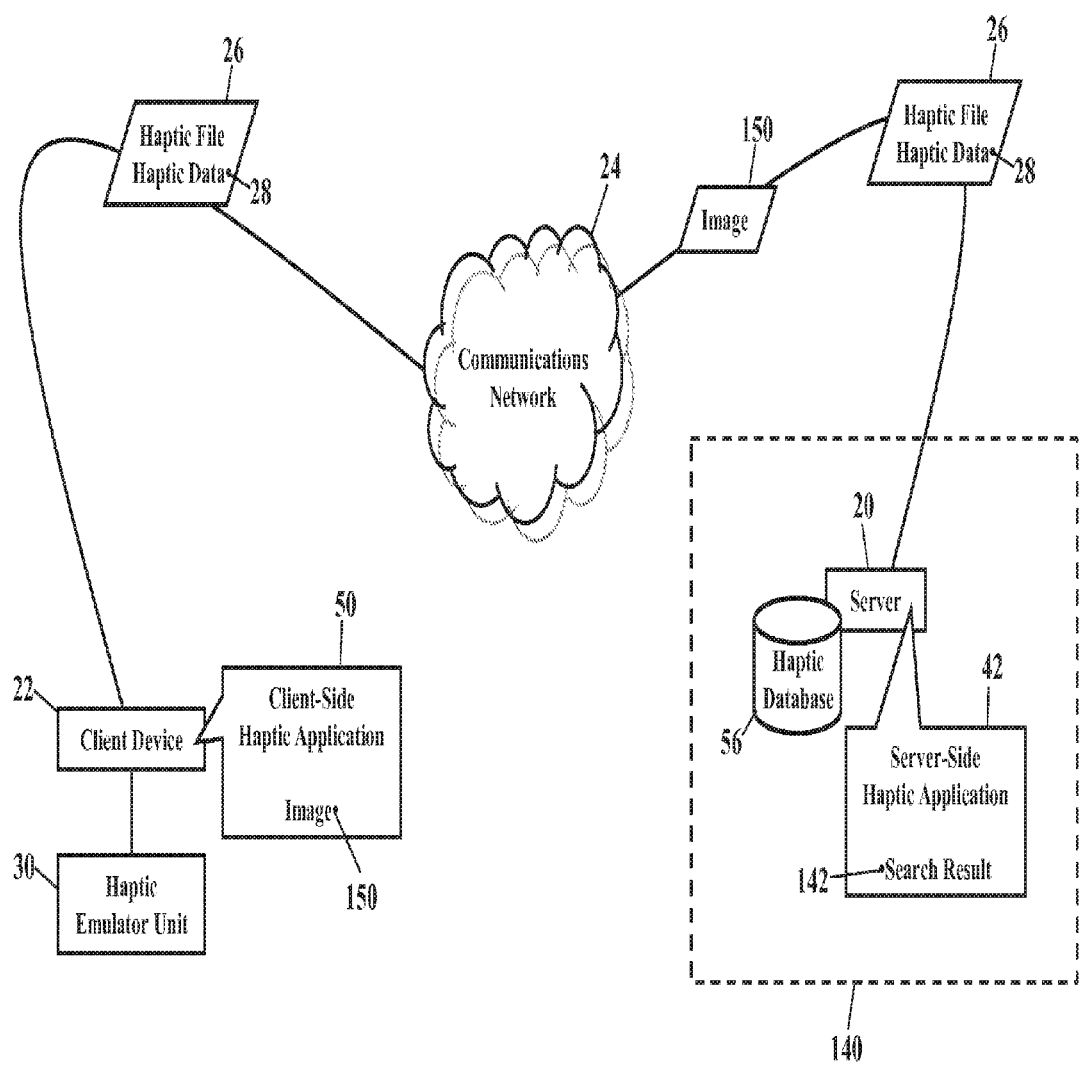

FIG. 12 is another schematic illustrating the haptic search engine 140, according to exemplary embodiments. Here, though, the server-side haptic application 42 may query based on image data. As the user shops, the user sees some merchandise of interest (e.g., handbag, leather seat, wood table, clothing). The user downloads an image 150 of the merchandise from an online catalog or webpage. If the user sees the merchandise in a merchant's physical store, the user may instead capture the image 150 using a digital camera, smart phone, or other client device 22. Regardless, the user submits the digital image 150 to the haptic search engine 140. The user may also submit metadata, such as textual descriptions of the merchandise, the seller, merchant, and or catalog publication. The server-side haptic application 42 queries the haptic database 56 for the search results 142 matching the query. For example, the search results 142 may include the haptic file 26 matching the query. The server-side haptic application 42 retrieves the haptic file 26 and sends the haptic file 26 to the client device 22 (or any other requested destination). The haptic file 26 may then be sent or routed to the haptic emulator unit 30 to emulate the personalized haptic/tactile feeling. Simultaneously, the client-side haptic application 50 may also personalized images of the merchandise, as earlier paragraphs explained. The shopper appraises the personalized haptic emulation, and/or the personalized images, and decides to place an order. The client-side haptic application 50 connects to an ordering and billing system to complete the order (not shown for simplicity).

Figure 13:
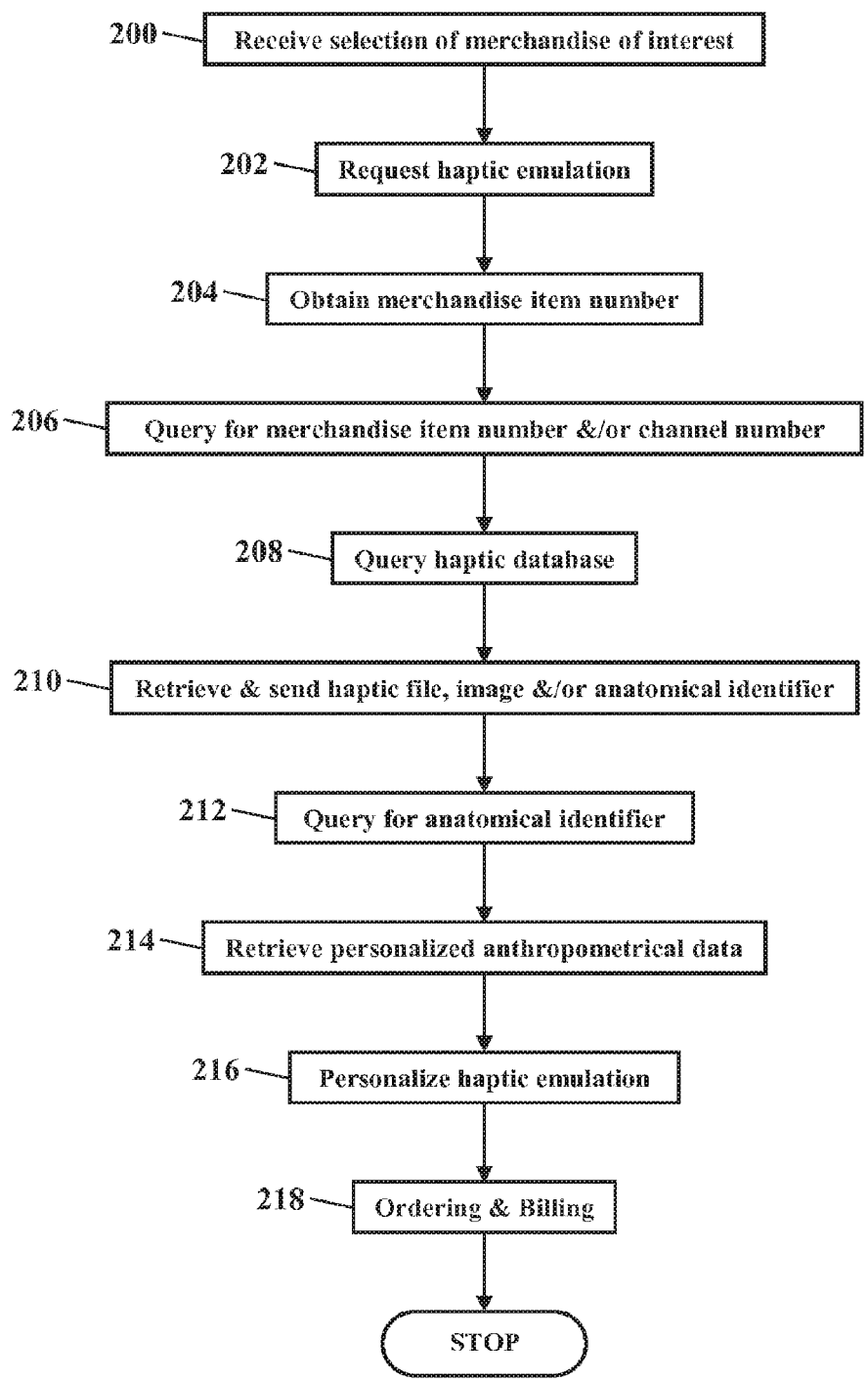
FIG. 13 is a flowchart illustrating haptic emulation, according to exemplary embodiments.

FIG. 13 is a flowchart illustrating haptic emulation, according to exemplary embodiments. As the user browses websites or watches Internet Protocol television, the user selects some merchandise of interest (Block 200). If the user desires the "touch and feel" of the merchandise, the user requests a haptic emulation (Block 202). The user, for example, may select a button on a remote control or select a graphical control in a graphical user interface. The client-side haptic application 50 obtains the merchandise item number 54 (Block 204). The client-side haptic application 50, for example, may establish a connection to an Internet Protocol television data stream (such as the stream 100 of video data) to obtain the merchandise item number 54 and/or channel number from the Internet Protocol television data stream. The merchandise item number 54 may also be downloaded from an online catalog, website, or database. Regardless, the client-side haptic application 50 queries the server 20 for the merchandise item number 54 and/or the channel number (Block 206). The server-side haptic application 42 queries the haptic database 56 (Block 208) and returns the haptic file 26, the image 80, and/or anatomical identifier 60 (Block 210). The client-side haptic application 50 queries the profile database 70 for the anatomical identifier 60 (Block 212) and retrieves the personalized anthropometrical data 32 (Block 214). The haptic emulation is personalized (Block 216). If the user wishes to purchase the merchandise, the client-side haptic application 50 connects to a merchandise ordering and billing system to complete an order (Block 218).

Figure 14:
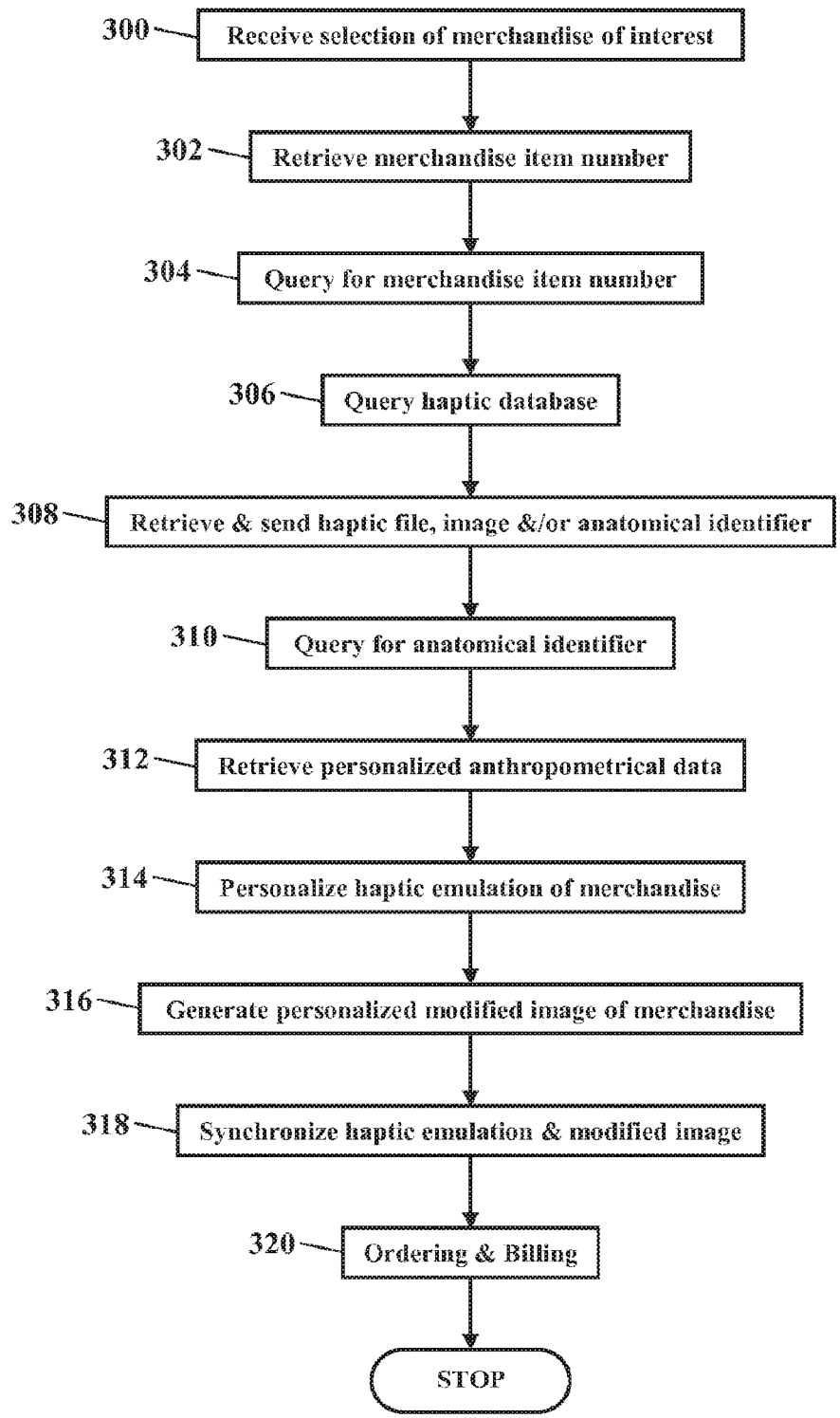
FIG. 14 is a flowchart illustrating haptic emulation in electronic commerce, according to exemplary embodiments.

FIG. 14 is a flowchart illustrating haptic emulation in electronic commerce, according to exemplary embodiments. Here the user may select the merchandise from an online catalog (Block 300). The client-side haptic application 50 queries to retrieve the merchandise item number 54 (Block 302). The client-side haptic application 50 queries the server 20 for the merchandise item number 54 (Block 304). The server-side haptic application 42 queries the haptic database 56 and retrieves the haptic file 26, the image(s) 80, and/or anatomical identifier 60 (Block 306). The client-side haptic application 50 queries the profile database 70 for the anatomical identifier 60 (Block 308) and retrieves the personalized anthropometrical data 32 (Block 310). The haptic emulation is personalized (Block 314). Again, if the merchandise is a bracelet, different individuals' hands have different sizes and contours. Hence, the haptic experience is different for each individual, even though the merchandise is the same. If the haptic emulator unit 30 merely downloads the haptic file 26 and presents it to the user, the emulation will be generic. Exemplary embodiments thus use the personalized anthropometrical data 32 as additional inputs to the haptic emulator unit 30. Utilizing the physical size and topography of the user's hand, the haptic emulator unit 30 will be able to accurately render a customized haptic feeling. In parallel, the personalized anthropometrical data 32 are used in creating a personalized visualization of the merchandise that is displayed (Block 316). The user, in other words, is shown wearing or experiencing the merchandise (e.g., the user is shown wearing the bracelet). The client-side haptic application 50 may synchronize the visual and haptic images (Block 318) such that when the user's hand is moved the touch feeling will vary accordingly. If the user wishes to purchase the merchandise, the client-side haptic application 50 connects to a merchandise ordering and billing system to complete an order (Block 320).

Figure 15:
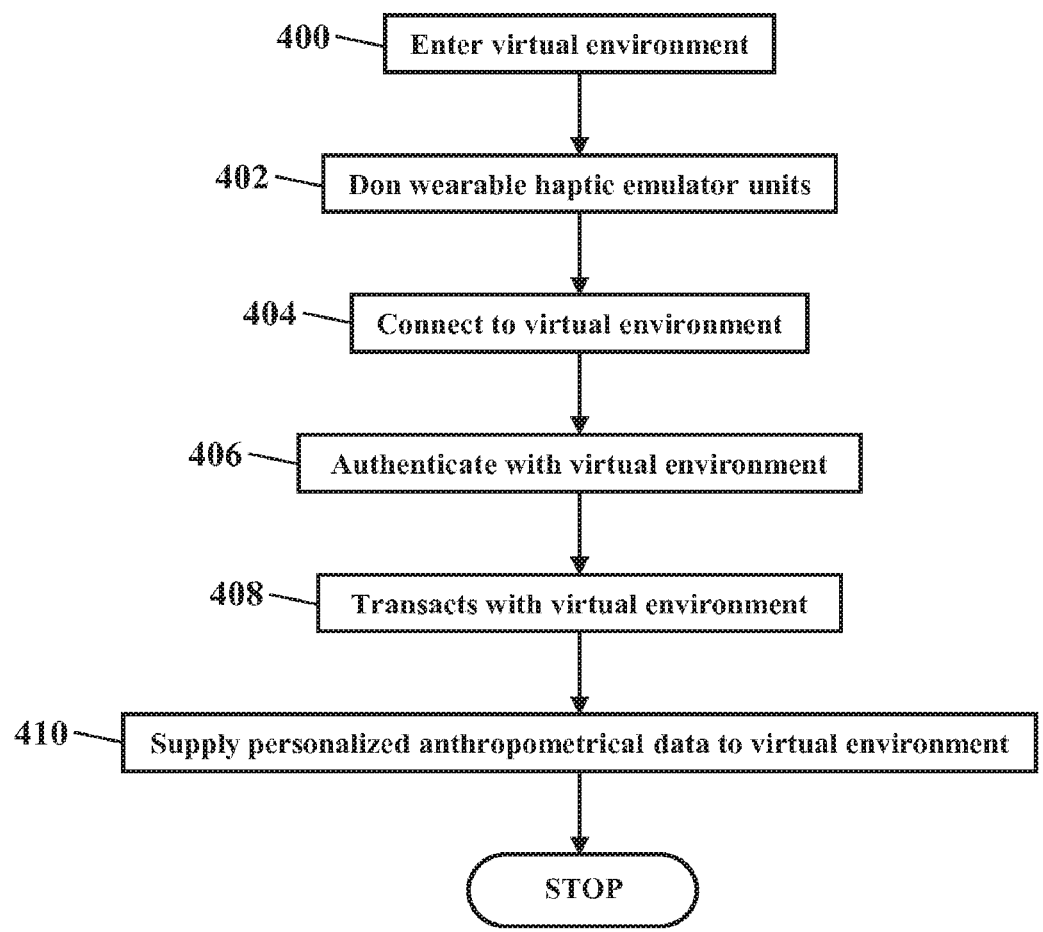
FIG. 15 is a flowchart illustrating haptic emulation in gaming environments, according to exemplary embodiments.

FIG. 15 is a flowchart illustrating haptic emulation in gaming environments, according to exemplary embodiments. Here the personalized anthropometrical data 32 may be applied to virtual environments. As the reader likely understands, virtual reality is a computer-simulated environment where users create avatars to represent themselves and to interact with other participants. The number of participants may be few or many (as in massively multiplier online games or "MMOGs"). Exemplary embodiments may personalize haptic emulations in virtual environments, and when players engage over the communications network 24 (such as the Internet). Even though avatars may be conventionally configured (such as for battle games), the virtual weaponry and costumes still need to fit the actual physical dimensions of the user pretending to wear them via haptic emulation. So the personalized anthropometrical data 32 is used for accurate rendering.

The user logs in and enters the virtual environment (Block 400). The user dons wearable haptic emulator units, such as weapons, armor, and costumes (Block 402). The user, for example, may wear haptic devices either at home environment or in a mall arcade equipped with such devices. The client device 22 calls or activates the client-side haptic application 50 and connects to the virtual environment, the haptic emulator units, the user's audio-visual environment, and the profile database 70 (Block 404). The client-side haptic application 50 may perform any authentication with the virtual environment to ensure the personalized anthropometrical data 32 is safely transmitted (Block 406). The user transacts with the virtual environment (Block 408). The user, for example, may virtually travel within the environment, obtain points or credits, and purchase or obtain dress paraphernalia and accoutrement for the user's avatar. The client-side haptic application 50 supplies the personalized anthropometrical data 32 to the virtual environment (Block 410), so that the goods/services can be customized per the user. During the virtual experience end users use the personalized goods and services supplied per their profiles.

Figure 16:
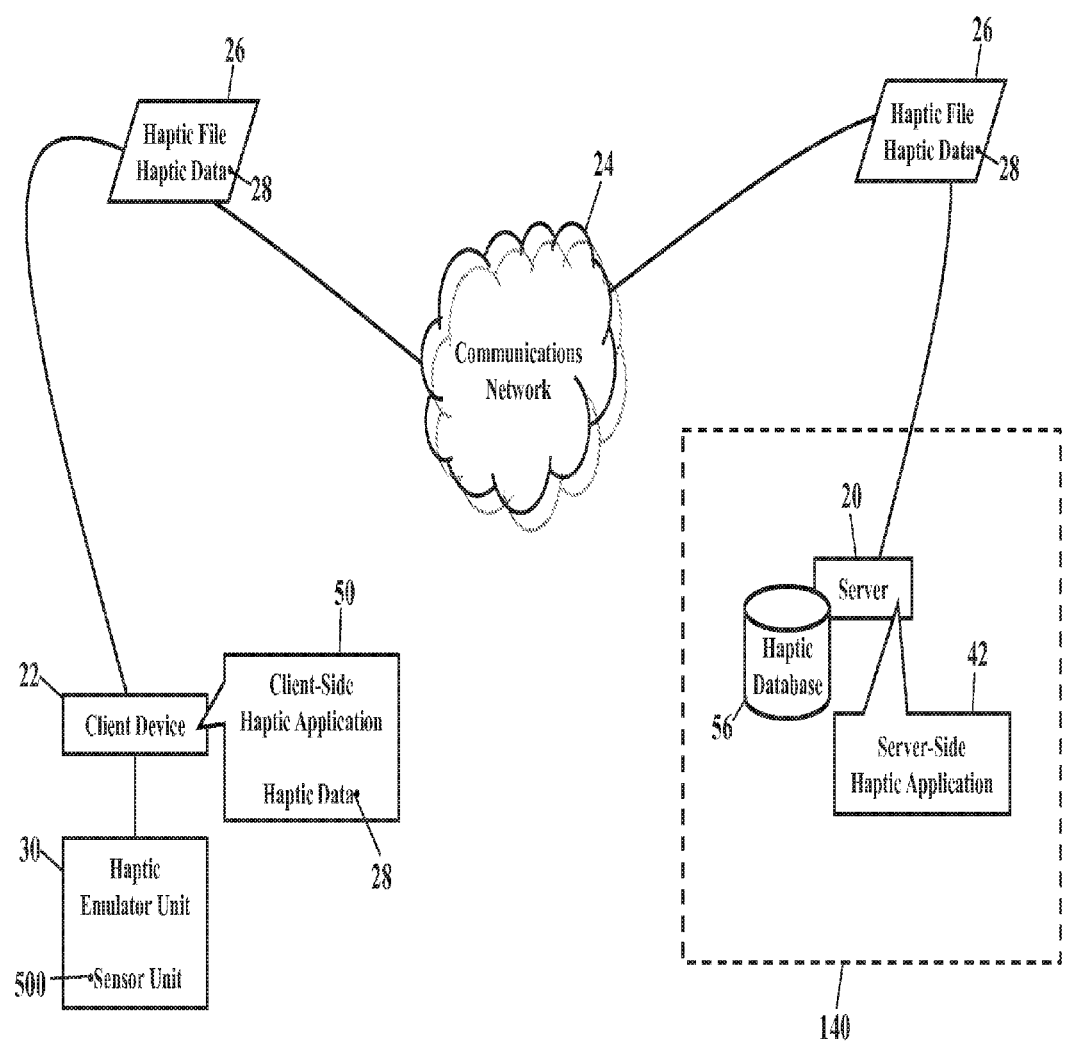
FIG. 16 is a schematic illustrating user-generated haptic scans, according to exemplary embodiments.

FIG. 16 is a schematic illustrating user-generated haptic scans, according to exemplary embodiments. Here the user may scan objects and upload the resulting haptic file 26 to the haptic database 56. Many users may wish to offer objects for sale on EBAY®, AMAZON®, CRAIG'S LIST®, and other online websites. Exemplary embodiments thus permit users to haptically scan an object and offer the resulting haptic file 26 to potential buyers. As FIG. 16 illustrates, here the haptic emulator unit 30 may also have a haptic/tactile sensor unit 500. The haptic/tactile sensor unit 500 scans the object to obtain the haptic data 28. The haptic data 28 is saved in the haptic file 26 and uploaded to the haptic database 56. The haptic database 56 may then be queried for the haptic file 26, as this disclosure explained. Again, the haptic/tactile sensor unit 500 may be purchased or rented and coupled to the IPTV-Internet environment via the client-side haptic application 50. The availability of tactile touch-feel (in addition to a photo) would be an attractive feature for prospective buyers.

Figure 17:
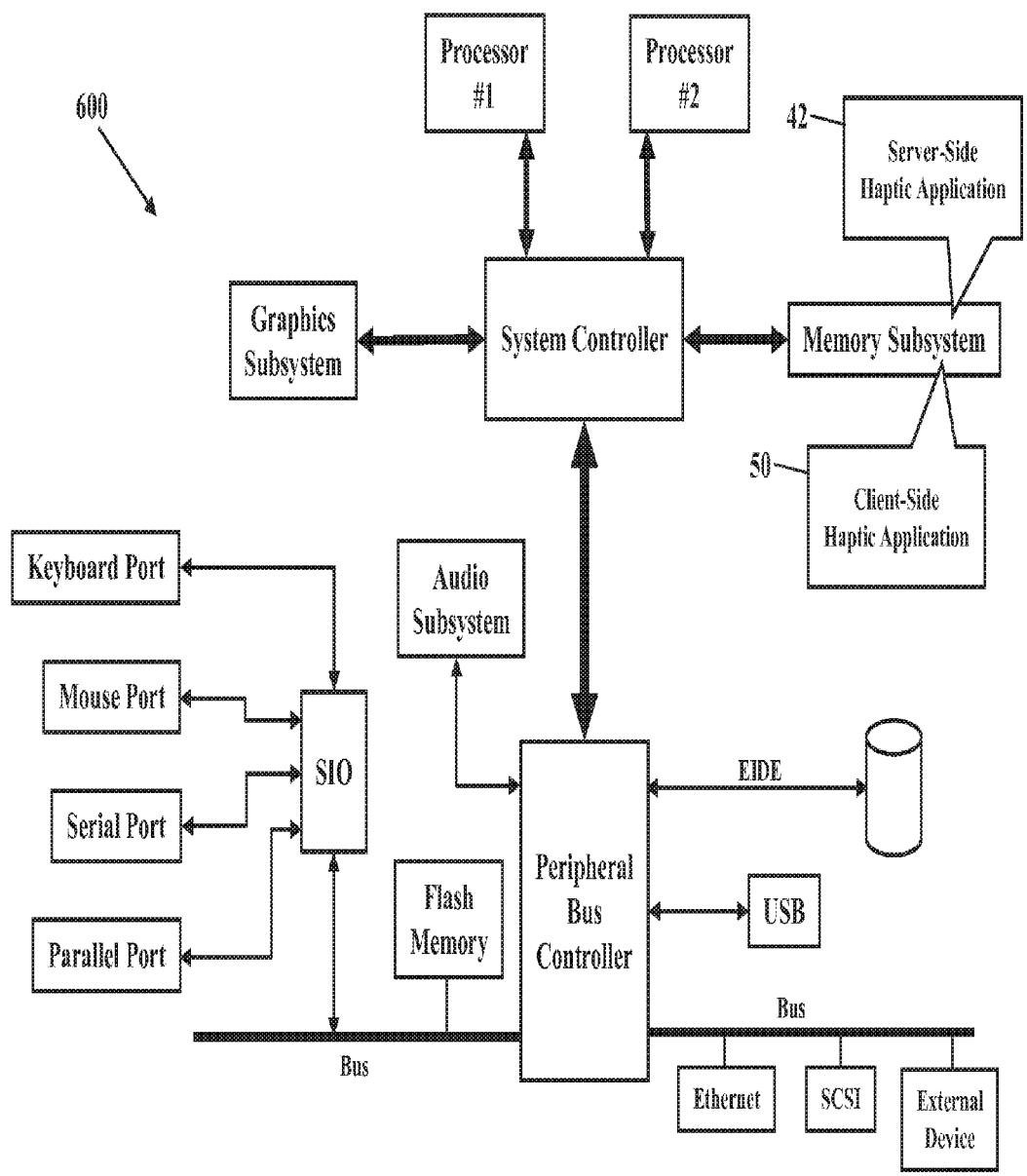
FIG. 17 is a schematic illustrating a processor-controlled device, according to exemplary embodiments.

FIG. 17 is a schematic illustrating still more exemplary embodiments. FIG. 17 is a generic block diagram illustrating the server-side haptic application 42 and the client-side haptic application 50 operating within a processor-controlled device 600. As this disclosure explained, the server 20 and the client device 22 may operate in any processor-controlled device 600. FIG. 17, then, illustrates the server-side haptic application 42 and the client-side haptic application 50 stored in a memory subsystem of the processor-controlled device 600. One or more processors communicate with the memory subsystem and execute the server-side haptic application 42 and/or the client-side haptic application 50. Because the processor-controlled device 600 is well-known to those of ordinary skill in the art, no detailed explanation is needed.

Figure 18:
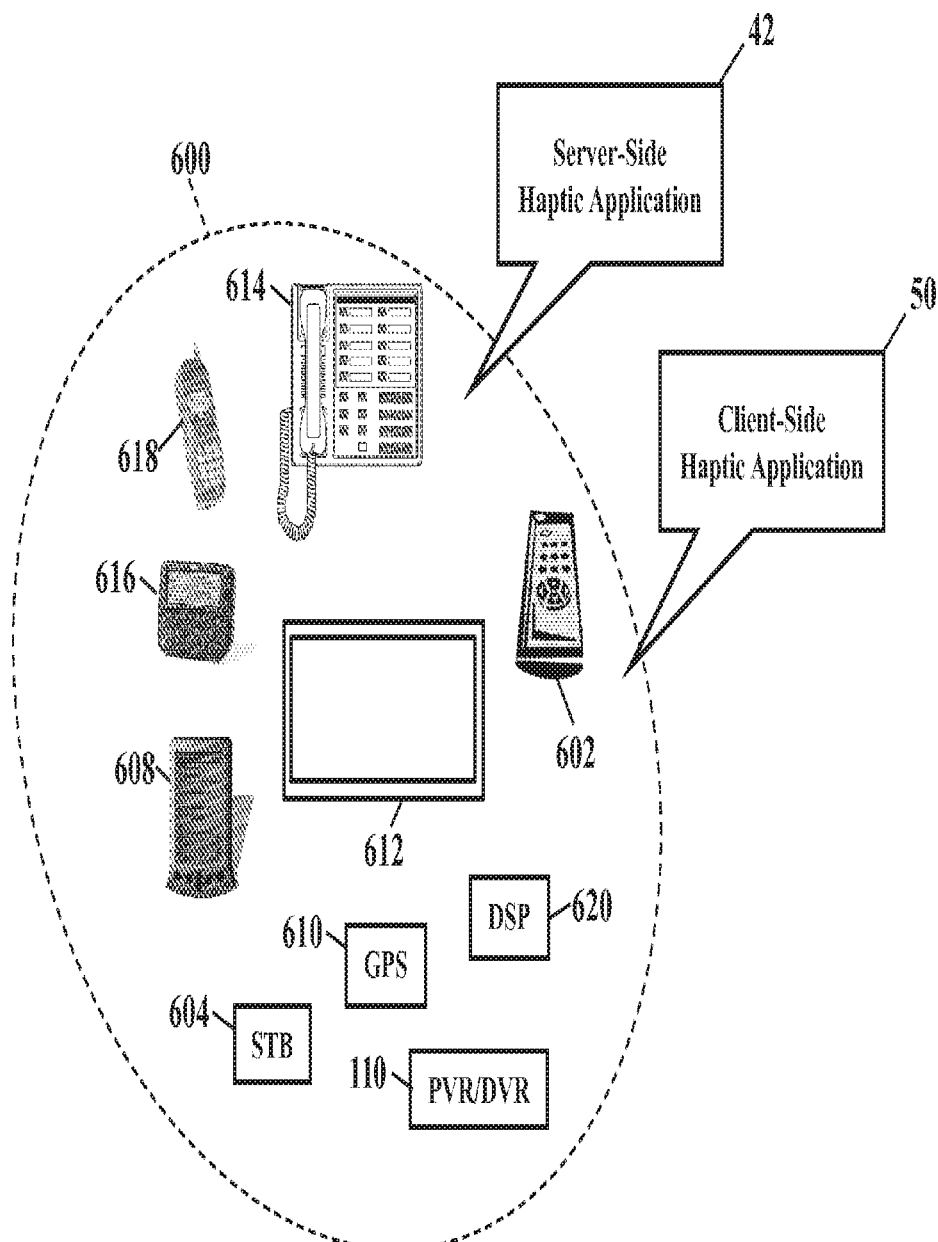
FIG. 18 depicts other possible operating environments for additional aspects of the exemplary embodiments.

FIG. 18 depicts other possible operating environments for additional aspects of the exemplary embodiments. FIG. 18 illustrates the server-side haptic application 42 and the client-side haptic application 50 operating within various processor-controlled devices 600. FIG. 18, for example, illustrates that the server-side haptic application 42 and/or the client-side haptic application 50 may entirely or partially operate within a remote control 602, a set-top box ("STB") (604), the personal/digital video recorder (PVR/DVR) 110, a personal digital assistant (PDA) 608, a Global Positioning System (GPS) device 610, an interactive television 612, an Internet Protocol (IP) phone 414, a pager 616, a cellular/satellite/smart phone 618, or any computer system, communications device, or processor-controlled device utilizing a digital signal processor (DP/DSP) 620. The device 600 may also include watches, radios, vehicle electronics, clocks, printers, gateways, mobile/implantable medical devices, and other apparatuses and systems. Because the architecture and operating principles of the various devices 600 are well known, the hardware and software componentry of the various devices 600 are not further shown and described.

Exemplary embodiments may be physically embodied on or in a computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. These types of computer-readable media, and other types not mention here but considered within the scope of the exemplary embodiments. A computer program product comprises processor-executable instructions for personalizing haptic emulations, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method, comprising:
generating, from a client device, a query regarding an article of merchandise, the article of merchandise having an associated digital image;
receiving by the client device, in response to the query, a haptic file defining a haptic emulation of the article of merchandise;
receiving, by the client device, a personal anatomical image from a plurality of personal anatomical images associated with a user;
receiving, by the client device, anthropometrical data personal to the user; and
modifying, by the client device, the digital image based on the personal anatomical image and the anthropometrical data, the modified digital image synchronized with the haptic emulation of the article of merchandise, wherein the haptic emulation of the article of merchandise is modified in accordance with the anthropometrical data and provided with the modified digital image.

2. The method of claim 1, further comprising:
retrieving the anthropometrical data using an anatomical identifier, the anatomical identifier identifying an anatomical part associated with a merchandise item number specific to the article of merchandise; and
retrieving, using the merchandise item number, the haptic file from a haptic database, the haptic file comprising haptic data describing the article of merchandise.

3. The method of claim 2, further comprising:
producing, by the client device, the haptic emulation of the article of merchandise; and
displaying, by the client device, the modified digital image with the haptic emulation.

4. The method of claim 1, wherein the modifying the digital image further comprises:
generating an image of the user based on the personal anatomical image and the anthropometrical data personal to the user; and
replacing an image of an individual in a portion of the digital image with the image of the user, the individual and the user being different people, and the image of the individual having an association with the article of merchandise.

5. The method of claim 3 further comprising:
haptically scanning the article of merchandise to generate the haptic file; and
uploading the haptic file to the haptic database, the haptic database associated with a source of the digital image.

6. The method of claim 4 wherein the personal anatomical image contains image data associated with individual body parts of a plurality of body parts of the user.

7. The method of claim 6 further comprising:
selecting at least one individual body part of the plurality of body parts, and using the image data associated with the individual body part selected in the modifying of the digital image.

8. The method of claim 3 further comprising:
selecting the personal anatomical image from the plurality of personal anatomical images associated with the user.

9. The method of claim 8 further comprising:
transmitting, from the client device, an electronic order for the article of merchandise based on the modified digital image displayed.

10. The method of claim 3 further comprising:
streaming video data to the client device, the video data including the digital image associated with the article of merchandise;
displaying the video data streamed; and
selecting the article of merchandise from the video data displayed.

11. A client device, comprising:
a processor;
a memory coupled to the processor, the memory having a program that stores computer program instructions that when executed cause the processor to perform operations for:
generating, from a client device, a query regarding an article of merchandise, the article of merchandise having an associated digital image;

receiving by the client device, in response to the query, a haptic file defining a haptic emulation of the article of merchandise;

receiving, by the client device, a personal anatomical image from a plurality of personal anatomical images associated with a user;

receiving, by the client device, anthropometrical data personal to the user; and modifying, by the client device, the digital image based on the personal anatomical image and the anthropometrical data, the modified digital image synchronized with the haptic emulation of the article of merchandise, wherein the haptic emulation of the article of merchandise is modified in accordance with the anthropometrical data and provided with the modified digital image.

12. The client device of claim 11, wherein the operations further comprise:

retrieving the anthropometrical data using an anatomical identifier, the anatomical identifier identifying an anatomical part associated with a merchandise item number specific to the article of merchandise; and retrieving, using the merchandise item number, the haptic file from a haptic database, the haptic file comprising haptic data describing the article of merchandise.

13. The client device of claim 12, wherein the operations further comprise:

producing, by the client device, the haptic emulation of the article of merchandise; and displaying, by the client device, the modified digital image with the haptic emulation.

14. The client device of claim 11, wherein the modifying the digital image operation further comprises:

generating an image of the user based on the personal anatomical image and the anthropometrical data personal to the user; and replacing an image of an individual in a portion of the digital image with the image of the user, the individual and the user being different people, and the image of the individual having an association with the article of merchandise.

15. The client device of claim 13 wherein the operations further comprise:

haptically scanning the article of merchandise to generate the haptic file; and uploading the haptic file to the haptic database, the haptic database associated with a source of the digital image.

16. The client device of claim 14 wherein the personal anatomical image contains image data associated with individual body parts of a plurality of body parts of the user, and wherein the operations further comprise:

selecting at least one individual body part of the plurality of body parts, and using the image data associated with the individual body part selected in the modifying of the digital image.

17. The client device of claim 13 wherein the operations further comprise:

streaming video data to the client device, the video data including the digital image associated with the article of merchandise;

displaying the video data streamed; and selecting the article of merchandise from the video data displayed; and transmitting, from the client device, an electronic order for the article of merchandise based on the modified digital image displayed.

18. A non-transitory computer-readable medium storing computer program instructions for electronic shopping using a client device, the computer program instructions, when executed on a processor, cause the processor to perform operations comprising:

generating, from a client device, a query regarding an article of merchandise, the article of merchandise having an associated digital image;

receiving by the client device, in response to the query, a haptic file defining a haptic emulation of the article of merchandise;

receiving, by the client device, a personal anatomical image from a plurality of personal anatomical images associated with a user;

receiving, by the client device, anthropometrical data personal to the user; and modifying, by the client device, the digital image based on the personal anatomical image and the anthropometrical data, the modified digital image synchronized with the haptic emulation of the article of merchandise, wherein the haptic emulation of the article of merchandise is modified in accordance with the anthropometrical data and provided with the modified digital image.

19. The non-transitory computer-readable medium of claim 18 wherein the modifying the digital image operation further comprises:

generating an image of the user based on the personal anatomical image and the anthropometrical data personal to the user; and replacing an image of an individual in a portion of the digital image with the image of the user, the individual and the user being different people, and the image of the individual having an association with the article of merchandise.

20. The non-transitory computer-readable medium of claim 18, wherein the operations further comprise:

streaming video data to the client device, the video data including the digital image associated with the article of merchandise;

displaying the video data streamed; and selecting the article of merchandise from the video data displayed; and transmitting, from the client device, an electronic order for the article of merchandise based on the modified digital image displayed.

* * * * *